US012659018B2

(12) United States Patent
Shi et al.

(10) Patent No.: US 12,659,018 B2
(45) Date of Patent: Jun. 16, 2026

(54) MOBILITY MANAGEMENT METHOD AND DEVICE

(71) Applicants: CHINA MOBILE COMMUNICATION CO., LTD. RESEARCH INSTITUTE, Beijing (CN); CHINA MOBILE COMMUNICATIONS GROUP CO., LTD., Beijing (CN)

(72) Inventors: Nanxiang Shi, Beijing (CN); Jianyin Zhang, Beijing (CN); Jinglei Liu, Beijing (CN)

(73) Assignees: CHINA MOBILE COMMUNICATION CO., LTD. RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 745 days.

(21) Appl. No.: 18/004,055

(22) PCT Filed: Jul. 2, 2021

(86) PCT No.: PCT/CN2021/104260
§ 371 (c)(1),
(2) Date: Dec. 31, 2022

(87) PCT Pub. No.: WO2022/007716
PCT Pub. Date: Jan. 13, 2022

(65) Prior Publication Data
US 2023/0261739 A1     Aug. 17, 2023

(30) Foreign Application Priority Data
Jul. 6, 2020     (CN) ........................ 202010641749.X

(51) Int. Cl.
*H04B 7/185*     (2006.01)
*H04W 36/08*     (2009.01)
*H04W 48/16*     (2009.01)

(52) U.S. Cl.
CPC ..... *H04B 7/18519* (2013.01); *H04B 7/18513* (2013.01); *H04W 36/083* (2023.05); *H04W 48/16* (2013.01)

(58) Field of Classification Search
CPC .. H04B 7/18513; H04B 7/1851; H04B 7/185; H04B 7/18517; H04B 7/18521;
(Continued)

(56) References Cited

U.S. PATENT DOCUMENTS

2018/0175932 A1     6/2018  Lucky
2019/0082481 A1     3/2019  Ravishankar
(Continued)

FOREIGN PATENT DOCUMENTS

CN     106937247 A     7/2017
CN     108390713 A     8/2018
(Continued)

OTHER PUBLICATIONS

Hughes. "NR-NTN: Paging in NGSO Satellite Systems", 3GPP TSG RAN WG3 Meeting #101 R3-184403, Aug. 24, 2018 (Aug. 24, 2018).
(Continued)

*Primary Examiner* — Khalid W Shaheed
(74) *Attorney, Agent, or Firm* — SYNCODA LLC; Feng Ma

(57)     ABSTRACT
A mobility management method includes: obtain a terminal a first position of a terminal from a geo-synchronous orbit (GEO) positioning satellite; the terminal searches for a first communication calendar according to the first position, and determines a network connection mode of the terminal;
(Continued)

when it is determined that the network connection mode is an NGSO satellite connection, the terminal accesses a network by means of a first NGSO satellite and sends, by means of the first NGSO satellite, a first request message carrying the first position to the network.

19 Claims, 14 Drawing Sheets

(58) Field of Classification Search
CPC .............. H04B 7/18515; H04B 7/2041; H04B 7/1853; H04W 84/06; H04W 16/28
See application file for complete search history.

(56) References Cited

U.S. PATENT DOCUMENTS

| | | | | |
|---|---|---|---|---|
| 2020/0028572 A1* | 1/2020 | Gaske | ................... | H04W 64/00 |
| 2020/0213000 A1* | 7/2020 | Arur | ................... | H04B 7/1851 |
| 2021/0282077 A1 | 9/2021 | Wei | | |

FOREIGN PATENT DOCUMENTS

| | | |
|---|---|---|
| CN | 109194383 A | 1/2019 |
| CN | 106788685 B | 6/2019 |
| CN | 110636609 A | 12/2019 |
| CN | 110913472 A | 3/2020 |
| CN | 110972257 A | 4/2020 |
| CN | 111106865 A | 5/2020 |
| CN | 111182658 A | 5/2020 |
| EP | 3869906 A1 | 8/2021 |
| JP | H1117606 A | 1/1999 |
| WO | 2020010595 A1 | 1/2020 |

OTHER PUBLICATIONS

International Search Report in the international application No. PCT/CN2021/104260, mailed on Oct. 8, 2021.

Written Opinion of the International Search Authority in the international application No. PCT/CN2021/104260, mailed on Oct. 8, 2021.
3GPP TR 23.737 V17.2.0 (Mar. 2021), 3rd Generation Partnership Project; Technical Specification Group Services and System Aspects; Study on architecture aspects for using satellite access in 5G (Release 17).
3GPP TS 23.501 V17.4.0 (Mar. 2022), 3rd Generation Partnership Project; Technical Specification Group Services and System Aspects; System architecture for the 5G System (5GS); Stage 2 (Release 17).
SG13-TD191/WP1 Study Group 13, Geneva, Nov. 25, 2022, Title: Draft new Recommendation ITU-T Y. FMSC-MM: "Mobility Management for fixed mobile NGSO-satellite convergence in IMT-2020 networks".
ITU-T Y.3104 (Dec. 2018), Series Y: Global Information Infrastructure, Internet Protocol Aspects, Next-Generation Networks, Internet of Things and Smart Cities; Architecture of the IMT-2020 network.
"3rd Generation Partnership Project; Technical Specification Group Services and System Aspects; Study on architecture aspects for using satellite access in 5G (Release 17)", 3GPP Draft; 23737-H10_CRS_Implemented, 3rd Genn Pneip Proje (3GPP), Mobile Competence Centre; 650, Route Deslucioles; F-06921 Sophia-Antipolis Cedex; France, Jul. 3, 2020 (Jul. 3, 2020), XP051906993, sections 5.1, 5.2, 5.6, 6.1, 6.2, 6.7, 6.8, 6.12, 6.13, 6.14. 91 pages.
"3rd Generation Partnership Project; Technical Specification Group Radio Access Network; Solutions for NR to support non-terrestrial networks (NTN) (Release 16)", 3GPP Standard; Technical Report; 3GPP TR 38.821, 3rd Generation Partnership Project (3GPP), Mobile Competence Centre; 650, Route Des Lucioles; F-06921 Sophia-Antipolis Cedex; France, No. vo.4.0, Apr. 11, 2019 (Apr. 11, 2019), pp. 1-46, XP051723405, sections 8.1-8.3. 46 pages.
Supplementary European Search Report in the European application No. 21836880.1, mailed on Nov. 29, 2023. 13 pages.
Nokia et al, "Paging issues in NTN", 3GPP TSG-RAN WG3 #101bis R3-185700, Chengdu, China, Oct. 8-12, 2018, the whole document. 8 pages.
"3rd Generation Partnership Project; Technical Specification Group Radio Access Network; Solutions for NR to support non-terrestrial networks (NTN) (Release 16)", 3GPP TR 38.821 V16.0.0 (Dec. 2019), the whole document. 140 pages.

* cited by examiner

GEO satellite
(positioning satellite)

NGSO satellite
(communication
satellite)

Satellite access
network

Satellite
interworking
gateway

Mobile access network

UE

IMT-2020/5G core
network (NACF/AMF)

Fixed access network

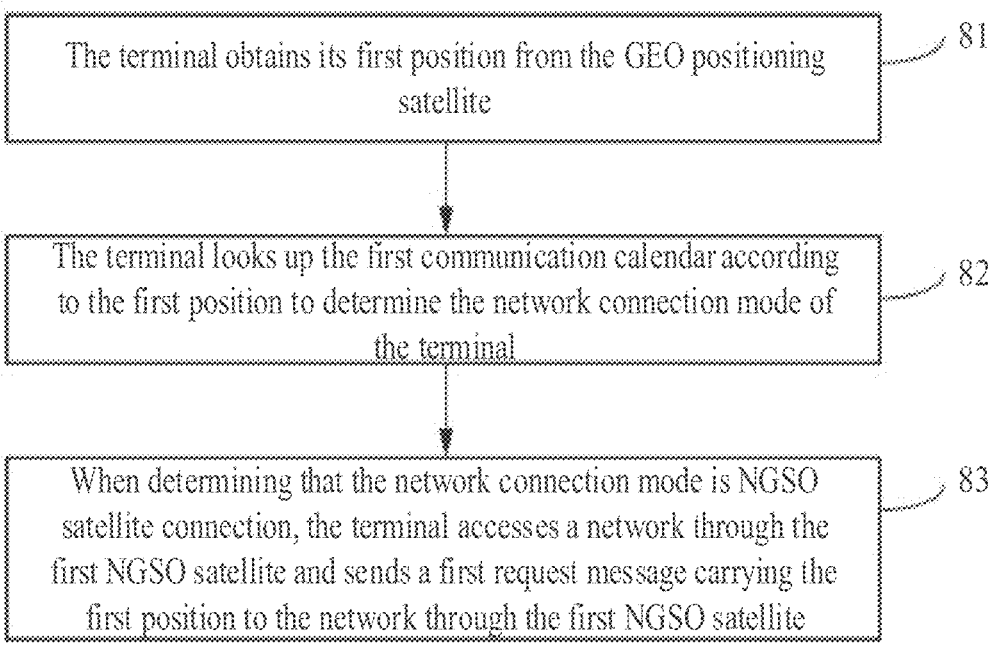

The terminal obtains its first position from the GEO positioning satellite — 81

The terminal looks up the first communication calendar according to the first position to determine the network connection mode of the terminal — 82

When determining that the network connection mode is NGSO satellite connection, the terminal accesses a network through the first NGSO satellite and sends a first request message carrying the first position to the network through the first NGSO satellite — 83

FIG. 8

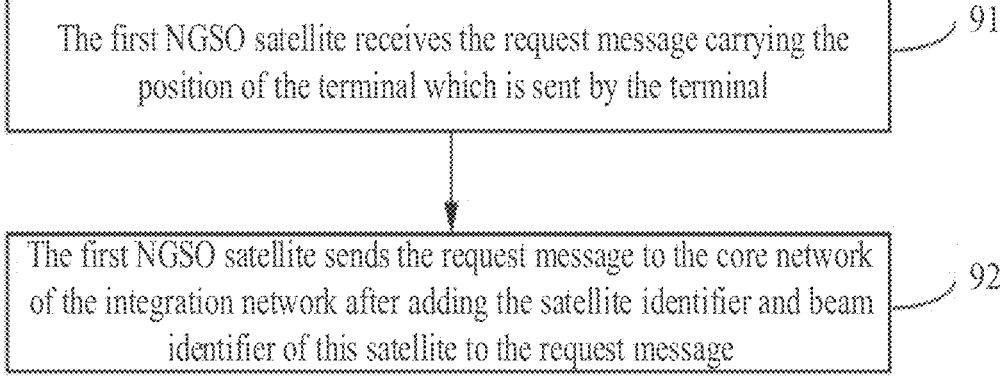

The first NGSO satellite receives the request message carrying the position of the terminal which is sent by the terminal — 91

The first NGSO satellite sends the request message to the core network of the integration network after adding the satellite identifier and beam identifier of this satellite to the request message — 92

FIG. 9

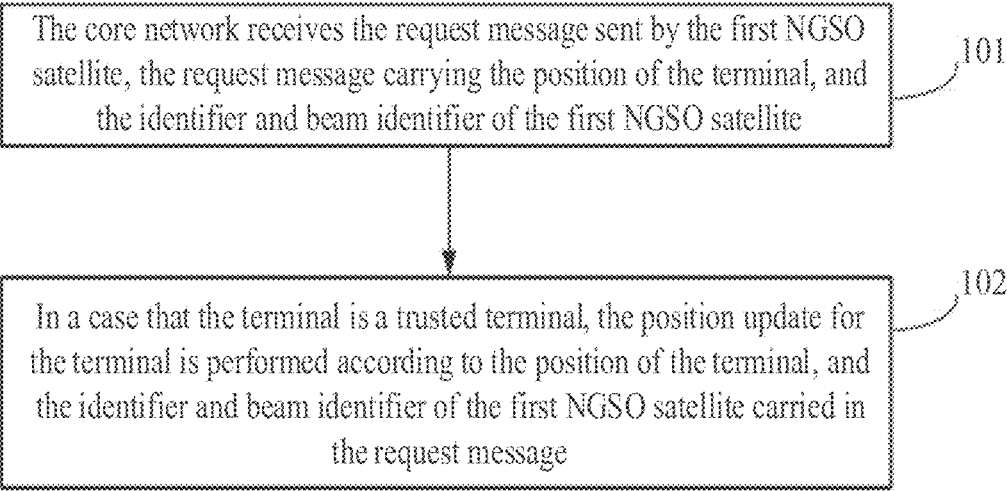

The core network receives the request message sent by the first NGSO satellite, the request message carrying the position of the terminal, and the identifier and beam identifier of the first NGSO satellite ⟋101

In a case that the terminal is a trusted terminal, the position update for the terminal is performed according to the position of the terminal, and the identifier and beam identifier of the first NGSO satellite carried in the request message ⟋102

FIG. 10

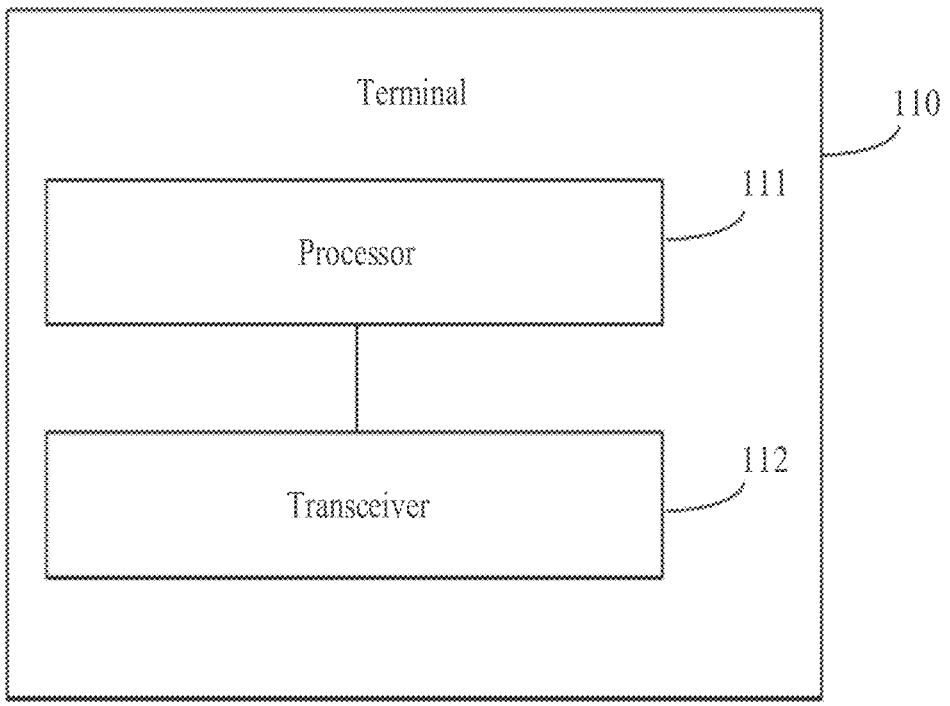

Terminal                                    110

Processor                                   111

Transceiver                                 112

FIG. 11

MOBILITY MANAGEMENT METHOD AND DEVICE

CROSS-REFERENCE TO RELATED APPLICATIONS

This is a National Stage of International Application No. PCT/CN2021/104260 filed on Jul. 2, 2021, which claims priority to Chinese patent application No. 202010641749.X, filed on Jul. 6, 2020. The disclosures of the above-referenced applications are hereby incorporated by reference in their entirety.

TECHNICAL FIELD

The present disclosure relates to the technical filed of mobile communications, and in particular to a mobility management method and device.

BACKGROUND

In recent years, a space-earth integration network is the focus of communication technology research in the world and also the key development direction of communication industry, and is widely recognized by the industry as the core technology of Beyond 5G (B5G) and the 6th Generation (6G) mobile communications. The space-earth integration network realizes system integration and efficient utilization of resources between a satellite network and a terrestrial network through the all-around integration, such as system integration, network integration, service integration and user integration, of satellite communications and terrestrial communications. With the rapid development of satellite communication technologies, Non-Geostationary Orbit (NGSO) satellites, especially low earth orbit satellites, have the communication capabilities comparable to the 5th Generation (5G) mobile communications in terms of bandwidth and delay, can complement and link with terrestrial networks and have great potential for development. Low earth orbit satellite constellations represented by SpaceX and OneWeb have entered commercial stage of large-scale deployment.

In the related art, the research on the architecture, protocol and network technology of the space-earth integration network is at the initial stage, and the industry has not yet formed a systematic technical consensus, international standards and industry standards. With the large-scale commercial use of 5G network and the application of fixed mobile integration technology, the satellite communications and 5G integration networks, especially a fixed, mobile and NGSO satellite integration network, have become a key research direction in the field of mobile communication and the space-earth integration, and its mobility management technology which is very different from the terrestrial communications is the key technology to be conquered first.

In the related art, a high-level framework of the fixed, mobile and satellite integration network is shown in FIG. 1. An integration core network is connected to a fixed access network (e.g., a fixed gateway), a mobile access network (e.g., a base station), and a satellite access network (e.g., a satellite gateway) at the same time. The integration core network implements unified control plane function, user plane function, service plane function, and management plane function for each domain.

In the related art, a mobility management framework of an integration network, which integrates the fixed access network, the mobile access network and the satellite access network, is shown in FIG. 2A to FIG. 2C. In the integration network, a satellite may serve as a radio frequency remote unit (as shown in FIG. 2A), or a base station data unit (gNB-Distributed Unit (gNB-DU) as shown in FIG. 2B), or all functions of a base station (data unit+control unit, a New Radio (NR) gNB as shown in FIG. 2C), and the satellite access gateway and other functions of the base station are deployed on the ground. In the integration network, the mobility management of multi-connection User Equipment (UE) is performed by the International Mobile Telecommunications (IMT)-2020/5G integration core network, and the mobility management of the NGSO satellites is performed by the satellite access gateway or the IMT-2020/5G integration core network.

In the related art, a mobility management method for the fixed, mobile and satellite integration network is shown in FIG. 3. The NGSO satellites are mobile relative to the ground. In a typical scenario, the multi-connection UE needs to switch the low earth orbit satellites to be accessed every 10 minutes. In the related art, the multi-connection UE needs to establish connections with multiple satellites at the same time; it determines a target satellite to be switched and a switching time point by measuring the signal strength.

In the related art, the mobility management method for the integration network is basically the same as that of a mobile network, additionally the position of the multi-connection UE is determined according to the satellite and beams accessed by the multi-connection UE; the integration network needs to page the multi-connection UE to update the position of the multi-connection UE, including a corresponding cell and/or Tracking Area (TA). The lower the altitude of the satellite, the smaller its beam size, but even for the low earth orbit satellite, its beam size is usually still larger than the size of the cell. In the related art, the cell and/or TA where the multi-connection UE resides cannot be accurately located; for this problem, no feasible solution has been given in the related art.

SUMMARY

At least one embodiment of the present disclosure provides a mobility management method and device, which can simplify a mobility management process for an integration network including a terrestrial access network and a satellite access network, reduce signaling overhead, and improve the efficiency of position update.

According to an aspect of the present disclosure, at least one embodiment provides a mobility management method applied to a terminal in an integration network. Access networks of the integration network include a satellite access network and a terrestrial access network, and the satellite access network includes a plurality of NGSO satellites. The method may include the following operations.

A first position of the terminal is obtained from a Geosynchronous Earth Orbit (GEO) positioning satellite.

According to the first position, the terminal looks up a first communication calendar to determine a network connection mode of the terminal, the first communication calendar including an NGSO satellite ephemeris and/or a terrestrial communication calendar.

When determining that the network connection mode is NGSO satellite connection, the terminal accesses a network through a first NGSO satellite and sends a first request message carrying the first position to the network through the first NGSO satellite.

In addition, according to at least one embodiment of the present disclosure, the terrestrial access network includes a fixed access network and/or a mobile access network; the NGSO satellite ephemeris includes at least one of position of the NGSO satellite, trajectory of the NGSO satellite and connection capability of the NGSO satellite, and the connection capability includes at least one of signal quality, communication rate, communication delay and communication reliability; the terrestrial communication calendar includes the connection capability and coverage area of the fixed access network and/or the mobile access network; and the network connection mode is NGSO satellite connection, fixed access network connection or mobile access network connection.

In addition, according to at least one embodiment of the present disclosure, the step that the terminal looks up, according to the first position, the first communication calendar to determine the network connection mode of the terminal may include the following operations.

The first communication calendar is looked up according to the first position to determine candidate access networks at the first position.

First connection performance evaluation values of all the candidate access networks are determined, and a target access network is selected according to the first connection performance evaluation values.

When the target access network is the satellite access network, second connection performance evaluation values of all first candidate NGSO satellites are determined, and the first NGSO satellite is selected according to the second connection performance evaluation values. The first candidate NGSO satellites are the NGSO satellites, connectable at the first position, that are determined by the terminal according to the NGSO satellite ephemeris.

In addition, according to at least one embodiment of the present disclosure, the connection capability includes at least one of signal quality, communication rate, communication delay and communication reliability.

The operation that the first connection performance evaluation values of all the candidate access networks are determined may include the following operation.

The first connection performance evaluation values of all the candidate access networks are calculated according to a first parameter combination. The first parameter combination includes at least one of following: user preference for access network, signal quality corresponding to candidate access network, communication rate corresponding to candidate access network, communication delay corresponding to candidate access network and communication reliability corresponding to candidate access network.

In addition, according to at least one embodiment of the present disclosure, the operation that the second connection performance evaluation values of all the candidate NGSO satellites are determined may include the following operation.

The second connection performance evaluation values of all the candidate NGSO satellites are calculated according to a second parameter combination. The second parameter combination includes at least one of following: user preference for the access network, signal quality corresponding to the first candidate NGSO satellite, communication rate corresponding to the first candidate NGSO satellite, communication delay corresponding to the first candidate NGSO satellite, and communication reliability corresponding to the first candidate NGSO satellite.

In addition, according to at least one embodiment of the present disclosure, the operation that the first communication calendar is looked up according to the first position to determine the candidate access networks at the first position may include the following operations.

The NGSO satellite ephemeris is looked up according to the first position to determine the NGSO satellites that are connectable at the first position, and the NGSO satellites are added to the candidate access networks as a candidate satellite access network.

The terrestrial communication calendar is looked up according to the first position to select the fixed access network and/or the mobile access network whose coverage area includes the first position, and the fixed access network and/or the mobile access network is added to the candidate access networks.

In addition, according to at least one embodiment of the present disclosure, after that the network connection mode is the NGSO satellite connection is determined, the method may also include the following operations.

The terminal obtains the second position of the terminal from the GEO positioning satellite.

When the second position satisfies a preset position update condition, third connection performance evaluation values of all second candidate NGSO satellites are determined by querying the NGSO satellite ephemeris, and the second NGSO satellite is selected according to the third connection performance evaluation values. The second candidate NGSO satellites are the NGSO satellites, connectable at the second position, that are determined by the terminal according to the NGSO satellite ephemeris.

The terminal accesses a network through the second NGSO satellite and sends a position update request message carrying the second position to the network.

In addition, according to at least one embodiment of the present disclosure, after that the network connection mode is the NGSO satellite connection is determined, the method may also include the following steps.

The terminal determines a switching time point of switching the NGSO satellite and a target NGSO satellite to be switched by querying the NGSO satellite ephemeris.

When the switching time point arrives, the terminal directly switches to the target NGSO satellite, and sends a satellite switch request message carrying a current third position of the terminal to the network through the target NGSO satellite.

In addition, according to at least one embodiment of the present disclosure, when the terminal accesses the integration network through the first NGSO satellite for the first time, the first request message is an initial communication request message for requesting to access for the first time.

Before the terminal accesses the network through the first NGSO satellite, when the terminal accesses the network through the fixed access network or the mobile access network, the first request message is a connection update request message for requesting to update the network connection mode.

In addition, according to at least one embodiment of the present disclosure, when the terminal accesses the integration network for the first time, the method may also include the following operation.

The terminal performs authentication and identity recognition with a core network of the integration network to determine whether the terminal is a trusted terminal. Only when the terminal is a trusted terminal, the core network of the integration network performs an operation of position update of the terminal and provides services to the terminal.

According to another aspect of the present disclosure, at least one embodiment provides a mobility management method applied to a first NGSO satellite in an integration network. The access networks of the integration network include the satellite access network and the terrestrial access network, and the satellite access network includes a plurality of NGSO satellites. The method may include the following operations.

The first NGSO satellite receives a request message carrying the position of a terminal which is sent by the terminal.

The first NGSO satellite sends the request message to the core network of the integration network after adding a satellite identifier and beam identifier of this satellite to the request message.

In addition, according to at least one embodiment of the present disclosure, the request message is any one of the following messages: the initial communication request message for requesting to access for the first time; the connection update request message for requesting to update a network connection mode; the position update request message for requesting to perform the position update; and the satellite switch request message for requesting to switch NGSO satellite.

According to another aspect of the present disclosure, at least one embodiment provides a mobility management method applied to a core network in an integration network. The access networks of the integration network include the satellite access network and the terrestrial access network, and the satellite access network includes a plurality of NGSO satellites. The method may include the following steps.

The core network receives the request message sent by the first NGSO satellite, the request message carrying the position of the terminal, and the identifier and beam identifier of the first NGSO satellite.

In a case that the terminal is a trusted terminal, the position updating for the terminal is performed according to the position of the terminal, and the identifier and beam identifier of the first NGSO satellite carried in the request message.

In addition, according to at least one embodiment of the present disclosure, the request message is any of the following messages: the initial communication request message for requesting to access for the first time, the connection update request message for requesting to update a network connection mode, the position update request message for requesting to perform the position update, and the satellite switch request message for requesting to switch NGSO satellite.

In addition, according to at least one embodiment of the present disclosure, when the request message is the satellite switch request message, the method may also include the following step.

According to the identifier and beam identifier of the first NGSO satellite carried in the satellite switch request message, the information of the NGSO satellite accessed by the terminal is updated.

In addition, according to at least one embodiment of the present disclosure, the operation that the position update for the terminal is performed according to the position of the terminal, and the identifier and beam identifier of the first NGSO satellite carried in the request message may include the following operation.

According to the position of the terminal carried in the request message, a cell and/or TA corresponding to the terminal is updated, and an association relationship among the terminal, the cell and/or TA, the identifier and beam identifier of the first NGSO satellite is maintained.

In addition, according to at least one embodiment of the present disclosure, the core network also maintains the NGSO satellite ephemeris and historical access information of the terminal in the integration network. The method may also include the following step.

Whether the terminal is a trusted terminal is determined by performing authentication and identity recognition for the terminal and according to the historical access information of the terminal and whether the identifier and the beam identifier of the first NGSO satellite in the request message match the locally maintained NGSO satellite ephemeris.

Only when the terminal is a trusted terminal, the core network performs the operation of the position update for the terminal and provides services to the terminal.

According to another aspect of the present disclosure, at least one embodiment provides a terminal in an integration network, which may include: a processor and a transceiver.

The processor is configured to obtain the first position of the terminal from the GEO positioning satellite, and look up the first communication calendar according to the first position to determine the network connection mode of the terminal, the first communication calendar including the NGSO satellite ephemeris and/or the terrestrial communication calendar.

The transceiver is configured to access a network through the first NGSO satellite and send the first request message carrying the first position to the network through the first NGSO satellite when determining that the network connection mode is NGSO satellite connection. The access networks of the integration network include the satellite access network and the terrestrial access network, and the satellite access network includes a plurality of NGSO satellites.

In addition, according to at least one embodiment of the present disclosure, when looking up the first communication calendar according to the first position to determine the network connection mode of the terminal, the processor is further configured to: look up, according to the first position, the first communication calendar to determine the candidate access networks at the first position; determine the first connection performance evaluation values of all the candidate access networks, and select the target access network according to the first connection performance evaluation values; and when the target access network is the satellite access network, determine the second connection performance evaluation values of all the first candidate NGSO satellites, and select the first NGSO satellite according to the second connection performance evaluation values. The first candidate NGSO satellites are the NGSO satellites, connectable at the first position, that are determined by the terminal according to the NGSO satellite ephemeris.

In addition, according to at least one embodiment of the present disclosure, when determining the second connection performance evaluation values of all the candidate NGSO satellites, the processor is further configured to: calculate the second connection performance evaluation values of all the candidate NGSO satellites according to the second parameter combination. The second parameter combination includes at least one of following: user preference for the access network, signal quality, communication rate, communication delay and communication reliability corresponding to the first candidate NGSO satellite.

According to another aspect of the present disclosure, at least one embodiment provides a terminal, which may include: a processor, a memory, and a program which is stored in the memory and capable of running in the processor. When executed by the processor, the program implements the steps of the above mobility management method.

According to another aspect of the present disclosure, at least one embodiment provides a first NGSO satellite in an integration network, which may include: a transceiver and a processor.

The transceiver is configured to receive the request message carrying the first position of the terminal which is sent by the terminal.

The processor is configured to send the request message to the core network of the integration network after adding the satellite identifier and beam identifier of this satellite to the request message.

The access networks of the integration network include the satellite access network and the terrestrial access network, and the satellite access network includes a plurality of NGSO satellites.

According to another aspect of the present disclosure, at least one embodiment provides a first NGSO satellite, which may include: a processor, a memory, and a program which is stored in the memory and capable of running in the processor. When executed by the processor, the program implements the steps of the above mobility management method.

According to another aspect of the present disclosure, at least one embodiment provides a core network device in an integration network, which may include: a transceiver and a processor.

The transceiver is configured to receive the request message sent by the first NGSO satellite, the request message carrying the position of the terminal, and the identifier and beam identifier of the first NGSO satellite.

The processor is configured to update, in a case that the terminal is a trusted terminal, the position update for the terminal is performed according to the position of the terminal, and the identifier and beam identifier of the first NGSO satellite carried in the request message.

The access networks of the integration network include the satellite access network and the terrestrial access network, and the satellite access network includes a plurality of NGSO satellites.

According to another aspect of the present disclosure, at least one embodiment provides a core network device, which may include: a processor, a memory, and a program which is stored in the memory and capable of running in the processor. When executed by the processor, the program implements the steps of the above mobility management method.

According to another aspect of the present disclosure, at least one embodiment provides a computer-readable storage medium, in which a program is stored. When executed by the processor, the program implements the steps of the above method.

Compared with the related art, the mobility management method and device provided by the embodiments of the present disclosure can update the position of the terminal in the processes that the terminal accesses a network for the first time, updates the network access mode, updates the position and switches the satellite. The embodiments of the present disclosure can simplify a communication connection establishment process between the terminal and the NGSO satellite and reduce the signaling overhead of position update.

BRIEF DESCRIPTION OF THE DRAWINGS

By reading the detailed description of optional implementation modes below, a variety of other advantages and benefits will become clear to those of ordinary skill in the art. The accompanying drawings are only intended to illustrate the purpose of the optional implementation modes and are not considered as a limitation on the present disclosure. In addition, the same reference marks are used to indicate the same parts throughout the accompanying drawings. In the accompanying drawings:

FIG. 8 is a flowchart when a mobility management method according to the embodiments of the present disclosure is applied to a terminal side;

FIG. 9 is a flowchart when a mobility management method according to the embodiments of the present disclosure is applied to an NGSO satellite side;

FIG. 10 is a flowchart when a mobility management method according to the embodiments of the present disclosure is applied to a core network;

FIG. 11 is a structural schematic diagram of a terminal provided by the embodiments of the present disclosure;

DETAILED DESCRIPTION

Figure 1:
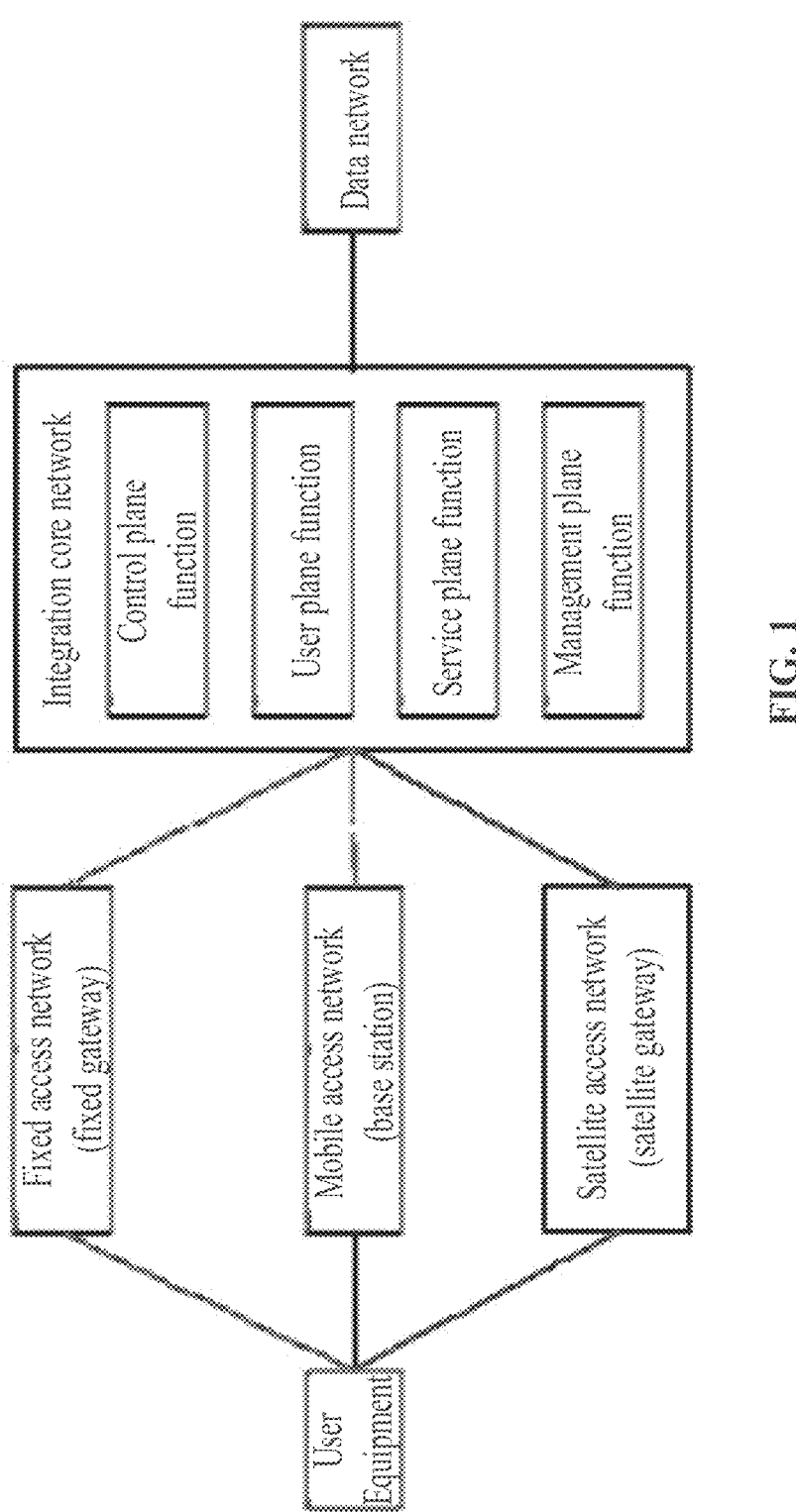
FIG. 1 is a schematic diagram of a high-level framework of a fixed, mobile and satellite integration network.
Figure 2A:
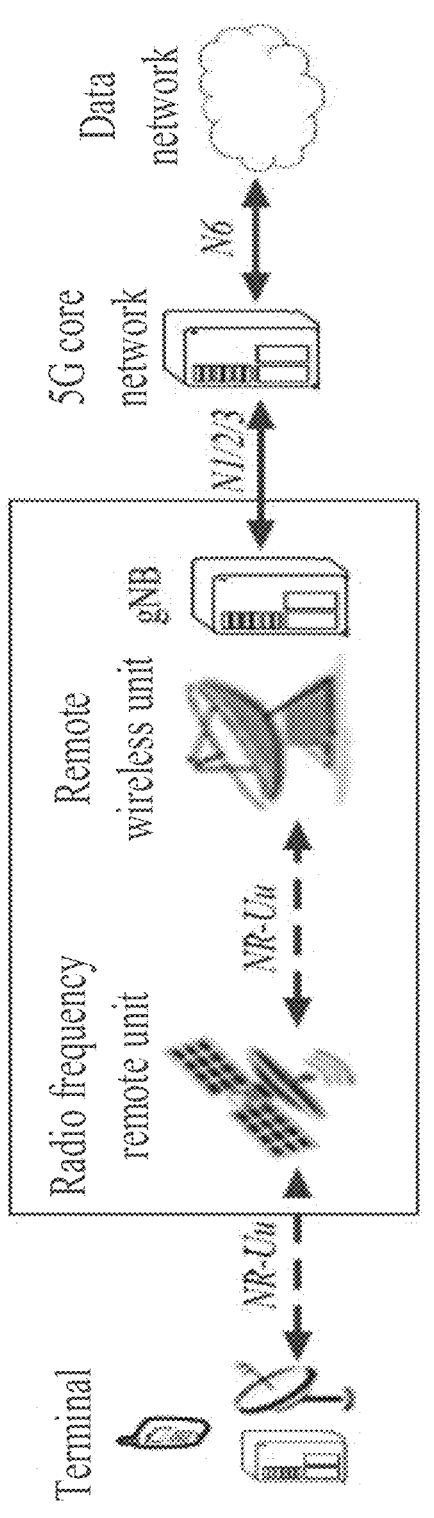
FIG. 2A to FIG. 2C are schematic diagrams of a mobility management framework of an integration network in the related art.
Figure 2B:
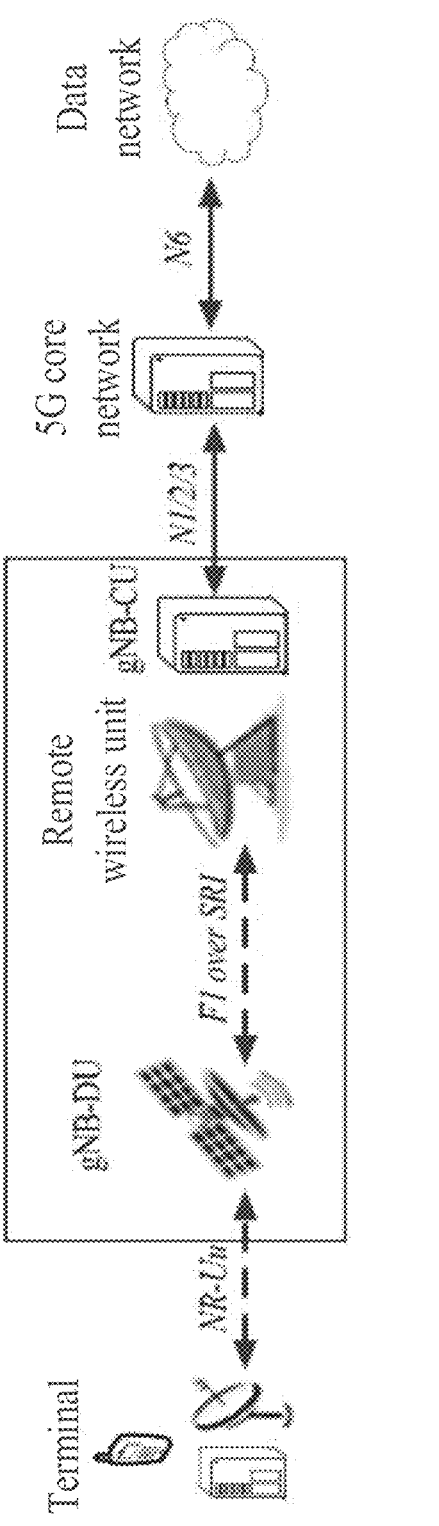
Figure 2C:
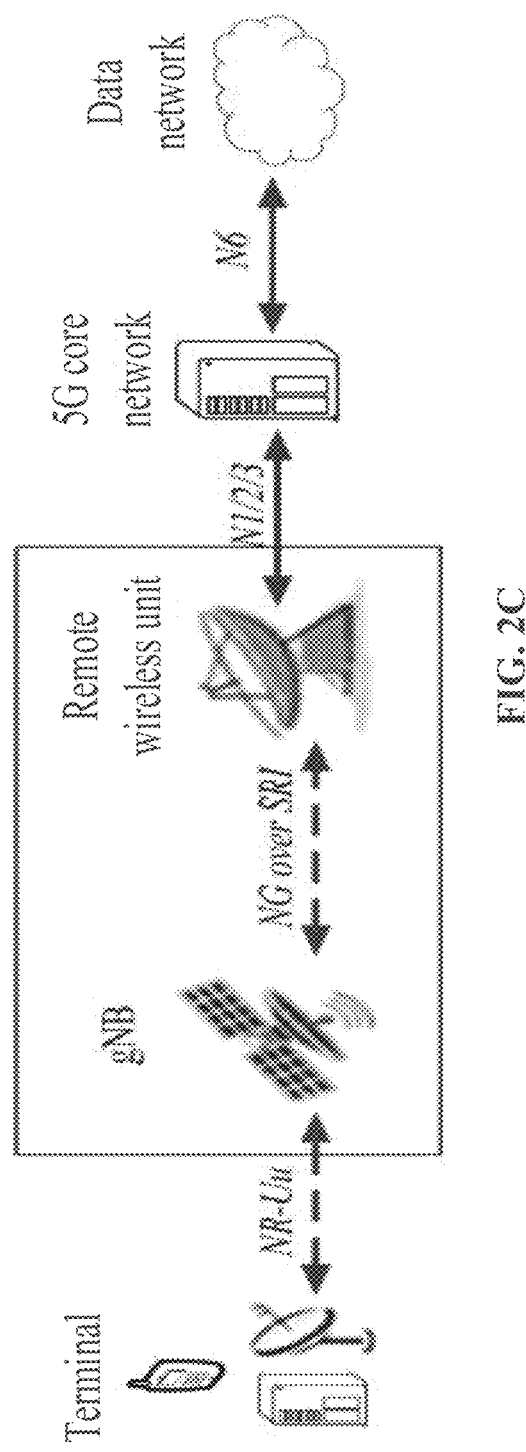
Figure 3:
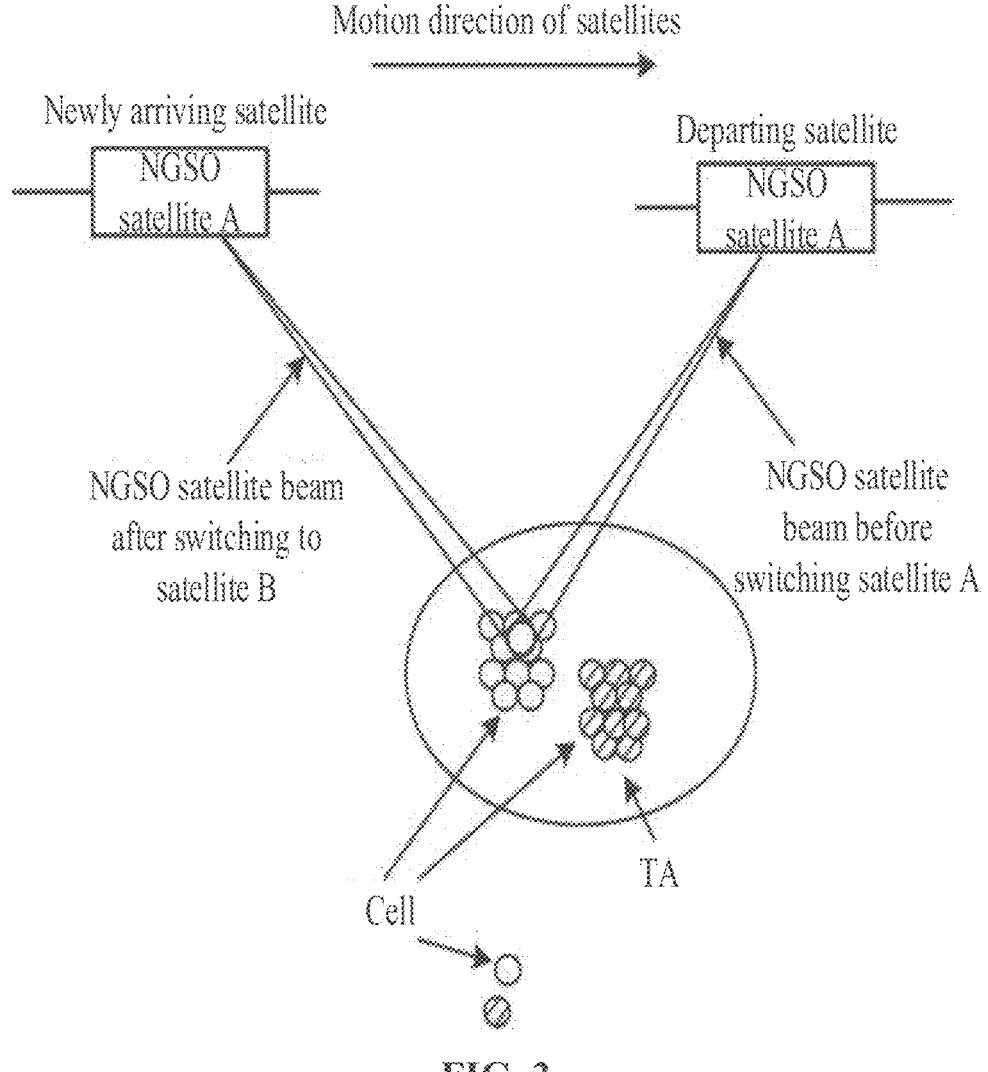
FIG. 3 is a schematic diagram of mobility management of an integration network in the related art.

Exemplary embodiments of the disclosure will be described in more detail with reference to the drawings. Although the exemplary embodiments of the disclosure are shown in the drawings, it should be understood that the disclosure may be implemented in various forms and shall not be limited by the embodiments described here. Rather, these embodiments are provided in order to have a more thorough understanding of the disclosure and to be able to fully convey the scope of the disclosure to those skilled in the art.

Terms "first", "second" and the like in the specification and claims of the application are used to distinguish similar objects and do not have to describe a specific sequence or order. It should be understood that the objects may be exchanged under appropriate circumstances, so that the embodiments of the present application described here may, for example, be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. "And/or" in the specification and the claims represents at least one of connected objects.

The technologies described herein are not limited to an NR system and a Long Term Evolution (LTE)/LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. Terms "system" and "network" are usually used interchangeably. The CDMA system may implement radio technologies such as CDMA2000 and Universal Terrestrial Radio Access (UTRA). UTRA includes Wideband CDMA (WCDMA) and other CDMA variations. The TDMA system may implement radio technologies such as Global System for Mobile Communication (GSM). The OFDMA system may implement radio technologies such as Ultra Mobile Broadband (UMB), Evolution-UTRA (E-UTRA), Institute of Electrical and Electronics Engineers (IEEE) 802.21 (Wireless Fidelity (Wi-Fi)), IEEE 802.16 (World Interoperability for Microwave Access (WiMAX)), IEEE 802.20, and Flash-OFDM. UTRA and E-UTRA are part of Universal Mobile Telecommunications System (UMTS). LTE and more advanced LTE (such as LTE-A) are new UMTS releases using E-UTRA. UTRA, E-UTRA, UMTS, LTE, LTE-A and GSM are described in the documents from the organization named after "3rd Generation Partnership Project (3GPP)". CDMA2000 and UMB are described in the documents from the organization named after "3GPP2". The technologies described herein may be applied not only to the above-mentioned systems and radio technologies but also to other systems and radio technologies. However, the NR system is described below as an example, and NR terms are used in most of the following descriptions although these technologies may also be applied to systems except the NR system.

The following descriptions are exemplary and not intended to limit the scope, applicability or configuration described in the claims. Functions and arrangements of discussed elements may be changed without departing from the spirit and scope of the disclosure. Various procedures or components may be omitted, replaced or added appropriately in each example. For example, the described method may be executed in sequences different from that described here, and various steps may be added, omitted or combined. In addition, features described with reference to some examples may be combined in other examples.

As described in the background technology, in the related art, it is difficult to update the position of a terminal in the integration network when the terminal accesses the network through a satellite. In order to solve the above problem, a mobility management method provided by the embodiments of the present disclosure can update the position of a terminal in the integration network, thereby performing mobility management on the terminal.

Figure 4:
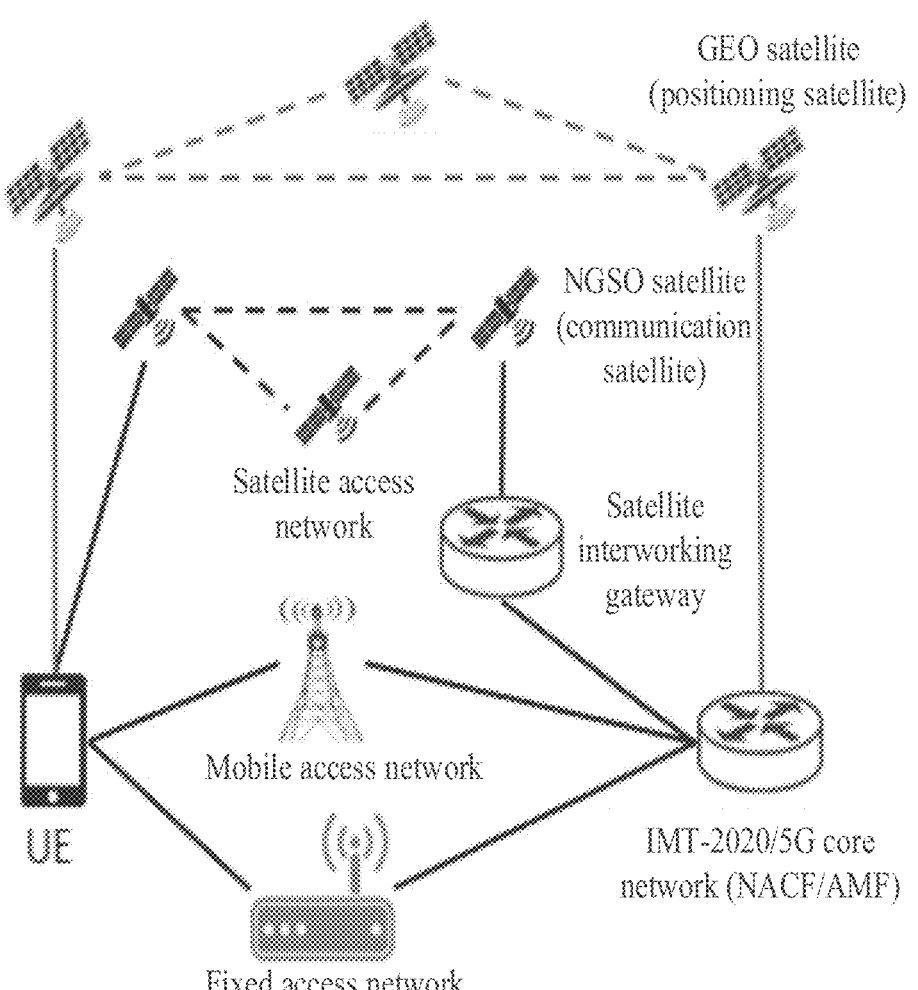
FIG. 4 is a schematic diagram of a mobility management architecture of an integration network according to the embodiments of the present disclosure.

FIG. 4 provides a schematic diagram of a mobility management architecture of an integration network according to the embodiments of the present disclosure. Access networks of the integration network include a satellite access network and a terrestrial access network. The satellite access network includes a plurality of NGSO satellites. The terrestrial access network may include a fixed access network and/or a mobile access network. The fixed access network refers to an access network that is accessed through fixed gateways (including various wireless access points, such as Access Point (AP), wireless fidelity (Wi-Fi) access point, and etc.). The mobile access network refers to a network that is accessed through base stations in the mobile communication technologies (e.g. an evolved Node B (eNB) and a gNB in the 4G and 5G mobile communication technologies).

Specifically, 1) NGSO communication satellites (including low earth orbit satellites and medium earth orbit satellites) are communication satellites (sometimes referred to as NGSO satellites herein) responsible for communication services of voice, message, data and other types. In addition, the embodiments of the present disclosure also relate to GEO positioning satellites (sometimes referred to as GEO satellites herein), which specifically include, but are not limited to, Global Positioning System (GPS) satellites, Galileo satellites, GLONASS satellites, Beidou satellites, etc. The GEO satellites are positioning satellites responsible for positioning services.

2) The terminal in the embodiments of the present disclosure is a multi-connection terminal (sometimes referred to as multi-connection UE herein) with connection capabilities to multiple access networks (including at least the satellite access network and the terrestrial access network). Both the multi-connection terminal and the core network of the integration network (the IMT-2020/5G integration core network is taken as an example herein) have an NGSO satellite connection capability and a GEO satellite connection capability, as well as one or both of a fixed access network connection capability and a mobile access network connection capability, thereby realizing the integration of fixed access (i.e. access through the fixed access network), mobile access (i.e. access through the mobile access network) and NGSO satellite access (i.e. access through the satellite access network).

3) The NGSO satellite is connected to the IMT-2020/5G integration core network through a satellite interworking gateway, and some network elements of the IMT-2020/5G integration core network, such as Network Access Control Function, NACF)/Access and Mobility Management Function (AMF), perform mobility management of the multi-connection UE. The satellite interworking gateway performs mobility management of the NGSO satellite (maintaining a connection relation with an NGSO satellite constellation).

4) The mobility management framework of the embodiments of the present disclosure does not rely on the establishment of a communication connection between the NGSO communication satellite and the GEO positioning satellite.

The mobility management method for an integration network provided by the embodiments of the present disclosure is specifically described below.

A) In the embodiments of the present disclosure, the multi-connection terminal supports local storage and dynamic update of a first communication calendar. The first communication calendar includes an NGSO satellite ephemeris and/or a terrestrial communication calendar.

Here, the NGSO satellite ephemeris may specifically include at least one of following: satellite identifier of the NGSO satellite, beam direction, precise position of the satellite, satellite trajectory, satellite connection capability and other information. The precise position and satellite trajectory of the NGSO satellite may be used to determine the satellite whose signal can be received by the terminal currently, namely the satellite which can communicate with, and may also be used to determine the information such as the departing satellite and the newly arriving satellite. The satellite connection capability may also specifically include at least one of following: signal quality of the satellite, communication rate of the satellite, communication delay of the satellite, and communication reliability of the satellite.

The terrestrial communication calendar may include the connection capability and coverage area of the fixed access network, and/or, the connection capability and coverage area of the mobile access network. The connection capability of the fixed access network or the mobile access network may also specifically include at least one of following: signal quality of the access network, communication rate of the access network, communication delay of the access network, and communication reliability of the access network. The coverage area of the fixed access network or the mobile access network may be used to indicate an area where the access network can provide services.

B) In the embodiments of the present disclosure, the core network of the integration network supports local storage and dynamic update of a second communication calendar. Specifically, the second communication calendar may be stored and dynamically updated by the NACF/AMF of the IMT-2020/5G integration core network. Here, the second communication calendar may include the NGSO satellite ephemeris. The specific content of the NGSO satellite ephemeris may refer to the description above and will not be repeated here.

C) In the embodiments of the present disclosure, the core network of the integration network, such as one or more of followings network elements: Authentication Server Function (ASF) of the IMT-2020 integration core network, Unified Subscription Management Function (USM) of the IMT-2020 integration core network, Authentication Server Function (AUSF) of the 5G integration core network, and Unified Data Management Function (UDM) of the 5G integration core network, may determine whether the multi-connection terminal is trusted based on an authentication mechanism of the related art, a user identity recognition mechanism of the related art, and the second communication calendar. When the multi-connection terminal is a trusted multi-connection terminal, it may cooperate with the core network of the integration network (for example, the IMT-2020/5G integration core network) to implement the satellite-positioning assisted mobility management method of the embodiments of the present disclosure. For an untrusted multi-connection terminal, the mobility management method of the related art may be used.

D) The multi-connection terminal sends an initial communication request message when accessing the integration network for the first time. After the multi-connection terminal accesses the integration network, users can manually change a connection mode of accessing the network, for example, from accessing the network through the mobile access network to accessing the network through the satellite access network. Of course, when certain preset events (for example, the signal quality of the current access network is lower than a preset quality threshold) are met, a change in the connection mode of accessing the network may be triggered. When the connection mode of accessing the network is changed, the multi-connection terminal sends the connection update request message for requesting to update the network connection mode.

Before sending the initial communication request message or the connection update request message, the multi-connection terminal may obtain its own real-time located position from the GEO positioning satellite, query the first communication calendar, calculate the connection performance evaluation values of various access networks, and select the connection mode according to the connection performance evaluation values, that is, select one or more of fixed access network connection, mobile access network connection, and NGSO satellite access network connection. The connection performance evaluation value may be calculated by weight based on the signal quality, communication rate, communication delay, and communication reliability of the access network, the user preference and other parameters.

E) When selecting the connection mode of the fixed access network or the mobile access network, the multi-connection terminal may perform fixed or mobile communications of voice, message, data and other types based on the related art. When selecting the connection mode of the NGSO satellite access network, the multi-connection terminal may obtain its own real-time located position from the GEO positioning satellite, query the NGSO satellite ephemeris, calculate the connection performance evaluation values of all the NGSO satellites, and establish a communication connection with an NGSO satellite with the optimal connection performance evaluation value to perform satellite communications of voice, message, data and other types. Here, the connection performance evaluation value is calculated by weight based on the signal intensity, communication rate, communication delay, and communication reliability of the NGSO satellite, the user preference, and other parameters. The parameters and weighting algorithms used to calculate the connection performance evaluation values of the NGSO satellites may be the same or different from those used to calculate the connection performance evaluation values of the access networks, which is not specifically limited in the embodiments of the present disclosure. In the above process of establishing the communication connection with the NGSO satellite, the embodiments of the present disclosure do not need to measure the quality of satellite signals, nor does the core network need to control the access of the multi-connection terminal, thus simplifying the access process of the terminal. In addition, during or after the establishment of a connection, the terminal may send a request message carrying its own position to the core network to trigger the core network to update the position of the terminal.

Some specific examples of calculating the connection performance evaluation values by weight are provided below. It is to be noted that selected parameters and weight values, as well as the weighting algorithms, may be adjusted as required in the embodiments of the present disclosure. The following examples are only examples of calculating the connection performance evaluation values that can be used by the embodiments of the present disclosure, and are not intended to limit the present disclosure.

For example, the embodiments of the present disclosure may convert each parameter to a corresponding standard value according to a preset mapping relationship between each parameter and the standard value. For example, the signal intensity is converted to the corresponding standard value according to the mapping relationship between the signal intensity and the standard value; the signal intensity is converted to the corresponding standard value according to the mapping relationship between the communication rate and the standard value, etc. Then, the connection performance evaluation value may be obtained by performing weighted summation on the standard values corresponding to all the parameters.

For another example, the embodiments of the present disclosure may set the priority of each parameter, and then generate the connection performance evaluation value based on the value of the parameter with the highest priority. Specifically, when the communication delay is set to the highest priority, the connection performance evaluation value may be generated according to the value of the communication delay.

F) After selecting the connection mode of the NGSO satellite access network, the multi-connection terminal obtains its real-time located position from the GEO positioning satellite; for example, when it finds that its position has changed greatly, it may need to initiate a position update process; in this case, the terminal may query the NGSO satellite ephemeris and select the NGSO satellite to be connected, and actively send the position update request carrying its own position to the NGSO satellite. Here, it is to be noted that due to the power consumption and cost of the satellite communication, even when the connection mode of the NGSO satellite access network is selected, the terminal usually does not establish a long connection with the satellite, but establishes the communication connection when needing to send and receive information as required by the communication.

G) By querying the NGSO satellite ephemeris, the multi-connection terminal may determine, according to a motion trajectory of the NGSO satellite, a time point at which the position of the terminal will move out of the coverage area of the NGSO satellite currently selected for access, take the time point as a switching time point, and reselect the NGSO satellite for access from the NGSO satellites that can be connected by the terminal at the switching time point as the target NGSO satellite to be switched. In this way, when the above switching time point arrives, the terminal may directly switch to the target NGSO satellite, establish the communication connection with the NGSO satellite, and send the request message carrying its own position to the network to inform the core network to update the position.

H) When selecting the connection mode of the NGSO satellite, the multi-connection terminal carries its own located position in the initial communication request message, the connection update request message, the position update request message and the satellite switch request message, and the NGSO communication satellite sends the above messages to the core network after adding the satellite identifier and beam identifier of this satellite to the messages. In this way, the core network (for example, the NACF/AMF of the IMT-2020/5G integration core network) may determine the cell and/or TA where the multi-connection terminal resides according to the located position of the multi-connection terminal, the satellite identifier, the beam identifier and other information in the above messages, thereby performing mobility management related operations based on the initial communication request message, connection update request message, position update request message and satellite switch request message of the multi-connection terminal.

Figure 5:
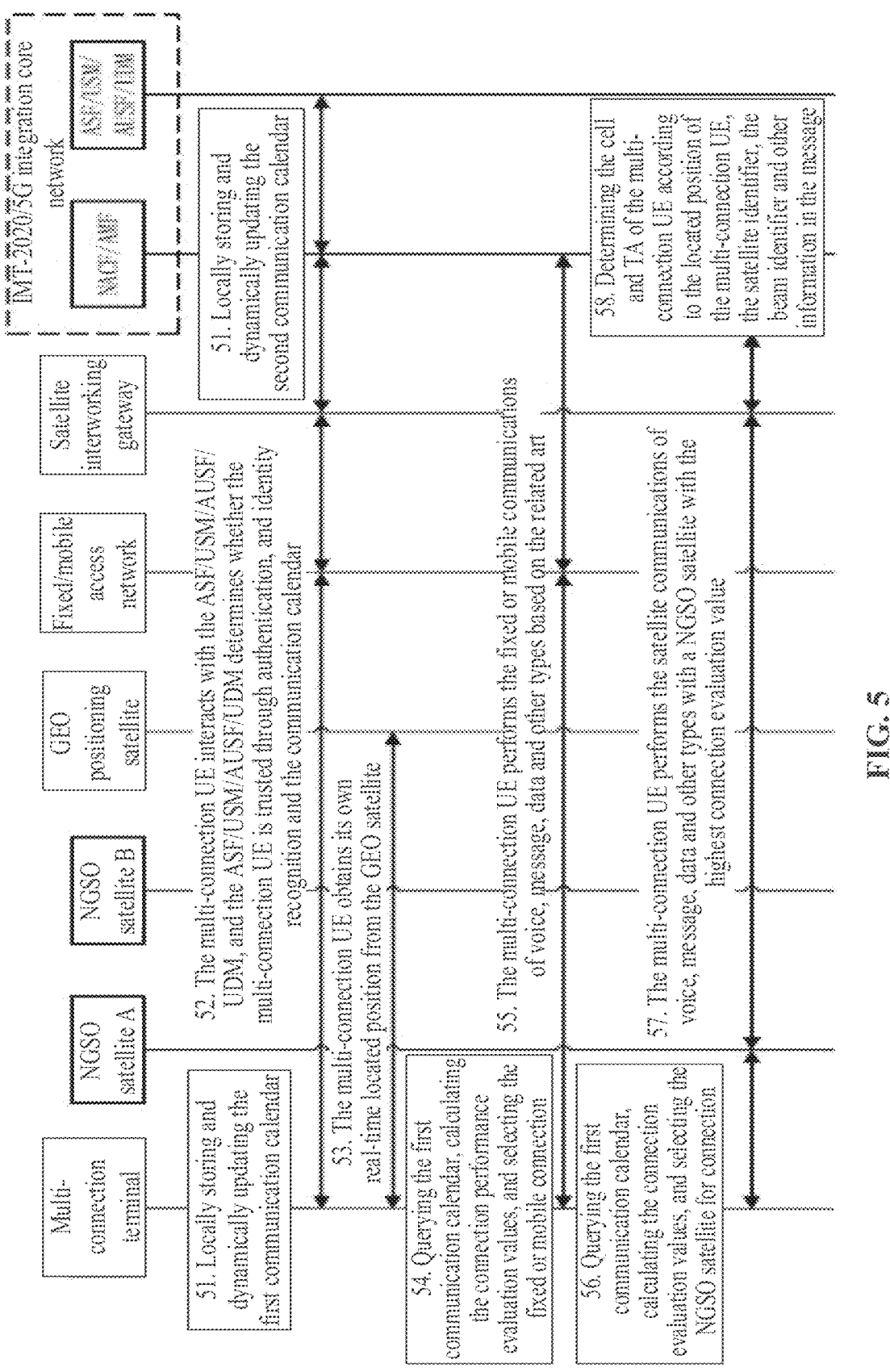
FIG. 5 is interaction diagram 1 of a mobility management method for an integration network according to the embodiments of the present disclosure.
Figure 6:
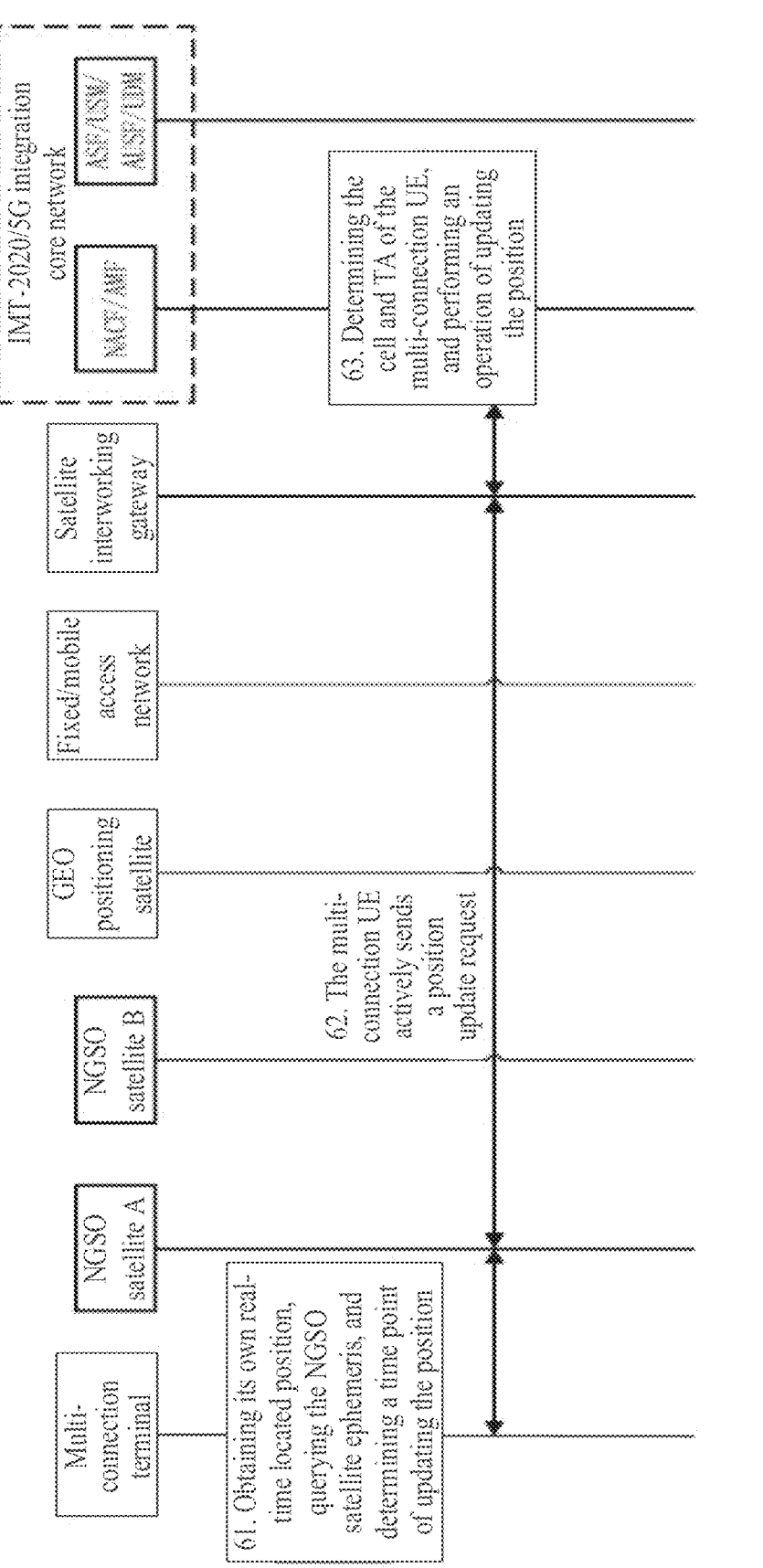
FIG. 6 is interaction diagram 2 of a mobility management method for an integration network according to the embodiments of the present disclosure.
Figure 7:
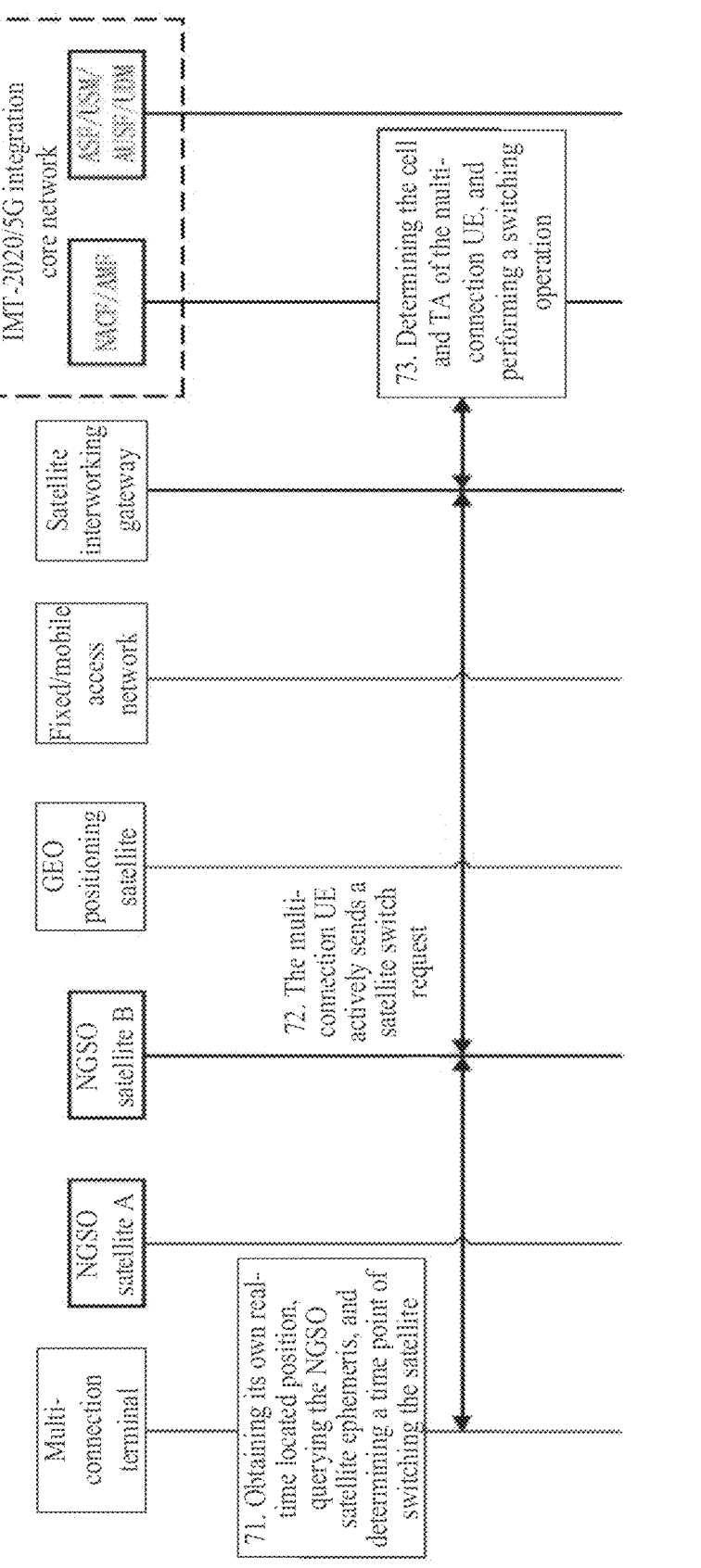
FIG. 7 is interaction diagram 3 of a mobility management method for an integration network according to the embodiments of the present disclosure.

FIG. 5 to FIG. 7 provide schematic diagrams of examples of an interaction flow among the terminal, various access networks and core networks in the above processes. In these examples, the IMT-2020/5G integration core network is taken as the core network of the integration network.

FIG. 5 shows a flow that the terminal accesses for the first time, specifically including the following steps.

At S51, the multi-connection terminal locally stores and dynamically updates the first communication calendar. The NACF/AMF of the IMT-2020/5G integration core network locally stores and dynamically updates the second communication calendar.

At S52, the multi-connection terminal interacts with the ASF/USM/AUSF/UDM of the IMT-2020/5G integration core network, and the ASF/USM/AUSF/UDM determines whether the multi-connection terminal is trusted through authentication, and identity recognition and in combination with the communication calendar and other information. When the multi-connection terminal is trusted, the subsequent flows in FIG. 5 to FIG. 7 are performed.

At S53, the multi-connection terminal obtains its own real-time located position from the GEO satellite.

At S54, the multi-connection terminal queries the first communication calendar, calculates the connection performance evaluation value, and selects the fixed access network connection, the mobile access network connection, or the satellite access network connection.

At S55, when selecting the fixed access network connection or the mobile access network connection, the multi-connection terminal performs the fixed or mobile communications of voice, message, data and other types based on the related art. Elaborations are omitted herein.

At S56, when selecting the satellite access network connection, the multi-connection terminal determines at least one candidate NGSO satellite that can provide services at the current position by querying the NGSO satellite ephemeris, then calculates the connection performance evaluation values of all the candidate NGSO satellites, and selects the NGSO satellite with the optimal evaluation value, which is assumed to be NGSO satellite A.

At S57, the multi-connection terminal establishes the communication connection with the NGSO satellite (assumed to be NGSO satellite A) with the highest connection performance evaluation value, performs the satellite communications of voice, message, data and other types, and sends the initial communication request message carrying its own located position to the core network through the NGSO satellite A. The NGSO satellite A adds its own satellite identifier, the beam direction and other information to the above message, and then sends the message to the core network.

At S58, the NACF/AMF of the IMT-2020/5G integration core network determines the cell and/or TA of the multi-connection terminal according to the located position of the multi-connection terminal, the satellite identifier, the beam identifier and other information in the above initial communication request message.

FIG. 6 shows a flow of updating the position of the terminal, specifically including the following steps.

At S61, the multi-connection terminal obtains its own real-time located position. when the current located position satisfies a preset position update condition (for example, the terminal has moved a large distance from its last located position), the multi-connection terminal queries the NGSO satellite ephemeris to determine at least one candidate NGSO satellite that can provide services at the current position, then calculates the connection performance evaluation values of all the candidate NGSO satellites, and selects the NGSO satellite with the optimal evaluation value, which is as summed to be the NGSO satellite A.

At S62, the multi-connection terminal actively sends the position update request message carrying its own position.

The NGSO satellite A adds its own satellite identifier, the beam direction and other information to the above message, and then sends the message to the core network.

At S63, the NACF/AMF of the IMT-2020/5G integration core network determines the cell and/or TA of the multi-connection terminal according to the located position of the multi-connection terminal, the satellite identifier, the beam identifier and other information in the above message, and performs an operation of updating the position.

FIG. 7 shows a flow that the terminal switches the satellite, specifically including the following steps.

At S71, by obtaining its own real-time located position and querying the NGSO satellite ephemeris, the multi-connection terminal may determine, according to the motion trajectory of the NGSO satellite, that the coverage area of the currently selected satellite will move out of the position of the terminal; in this case, the terminal may select the target NGSO satellite whose coverage area will enter the position of the terminal and determine the time point at which the coverage area of the target NGSO satellite (as-sumed to be NGSO satellite B) enters the position of the terminal, thereby determining the time point of switching the satellite.

At S72, when the time point arrives, the multi-connection terminal actively sends a satellite switch request, directly establishes the communication connection with the NGSO satellite B, and sends the satellite switch request message carrying its own position. The NGSO satellite A adds its own satellite identifier, the beam direction and other information to the above message, and then sends the message to the core network.

At S73, the NACF/AMF of the IMT-2020/5G integration core network determines the cell and/or TA of the multi-connection terminal according to the located position of the multi-connection terminal, the satellite identifier, the beam identifier and other information in the message, and updates the information of the NGSO satellite currently accessed by the multi-connection terminal, thereby completing the switching operation of the terminal.

The embodiments of the present disclosure are described in detail from the interaction among the devices. The method of the embodiments of the present disclosure is described below from each device side.

Referring to FIG. 8, when applied to a terminal side, a mobility management method provided by the embodiments of the present disclosure may include the following steps.

At S81, the terminal obtains its first position from the GEO positioning satellite.

Here, the GEO positioning satellite may be a satellite with a positioning service function, such as a GPS satellite, Galileo satellite, GLONASS satellite or Beidou satellite; and the terminal may obtain its own geographical position, which is called the first position here, through the position-ing service of the positioning satellite.

At S82, the terminal looks up the first communication calendar according to the first position to determine the network connection mode of the terminal.

Here, the first communication calendar includes the NGSO satellite ephemeris and/or the terrestrial communi-cation calendar; the NGSO satellite ephemeris includes at least one of following: position of the NGSO satellite, trajectory of the NGSO satellite and connection capability of the NGSO satellite. The terrestrial communication calendar includes the connection capability and coverage area of the fixed access network and/or the mobile access network; and the network connection mode is the NGSO satellite connec-tion, the fixed access network connection or the mobile access network connection.

In S82, the terminal may look up the first communication calendar according to the first position where it resides to determine the candidate access networks at the first position. Specifically, the terminal may look up the NGSO satellite ephemeris according to the first position to determine the NGSO satellite that can be connected at the first position, and add the NGSO satellite to the candidate access networks as a candidate satellite access network (at this point, the candidate satellite access network is represented by this NGSO satellite); and the terminal may look up the terrestrial communication calendar according to the first position to select the fixed access network and/or the mobile access network whose coverage area includes the first position, and add the fixed access network and/or the mobile access network to the candidate access networks, so that one or more candidate access networks may be obtained. Then, first connection performance evaluation values of all the candi-date access networks are determined, and the target access network is selected from the candidate access networks according to the first connection performance evaluation values.

Here, as an implementation mode, the first connection performance evaluation values of all the candidate access networks generated in advance may be recorded in the first communication calendar. The first connection performance evaluation values may be calculated in advance according to the first parameter combination, and the first connection performance evaluation values correspond to the geographi-cal position. In this way, the terminal may look up the first communication calendar according to the first position, and then obtain the first connection performance evaluation values of all the candidate access networks.

The first parameter combination includes at least one of following: the user preference for the access network, the signal quality corresponding to the candidate access net-work, the communication rate corresponding to the candi-date access network, the communication delay correspond-ing to the candidate access network, and the communication reliability corresponding to the candidate access network. For example, when the candidate access network is the satellite access network, the parameters such as the signal quality, communication rate, communication delay and communication reliability corresponding to the candidate access network are represented by the parameters such as the signal quality, communication rate, communication delay and communication reliability of the NGSO satellite repre-senting the candidate access network. For another example, when the candidate access network is the mobile access network (or fixed access network), the parameters such as the signal quality, communication rate, communication delay and communication reliability corresponding to the candidate access network are represented by the parameters such as the signal quality, communication rate, communi-cation delay and communication reliability of a base station corresponding to the mobile access network (or an access point corresponding to the fixed access network).

As another implementation mode, the terminal may cal-culate the first connection performance evaluation values of all the candidate access networks according to the first parameter combination. The calculation method of the con-nection performance evaluation value may refer to the description above and will not be repeated here.

In the embodiments of the present disclosure, when the selected target access network is the satellite access network, the second connection performance evaluation values of all the first candidate NGSO satellites are further determined, and the first NGSO satellite is selected according to the second connection performance evaluation values (that is, the first candidate NGSO satellite corresponding to the optimal second connection performance evaluation value is taken as the first NGSO satellite). The first candidate NGSO satellites are the NGSO satellites, connectable at the first position, that are determined by the terminal according to the NGSO satellite ephemeris. Similarly, the method for determining the second connection performance evaluation values may be looking up, according to the first position, the second connection performance evaluation values of all the NGSO satellites recorded in advance in the first communication calendar, or calculating, by the terminal, the second connection performance evaluation values of all the first candidate NGSO satellites according to the second parameter combination. The second parameter combination includes at least one of following: the user preference for the access network, the signal quality corresponding to the first candidate NGSO satellite, communication rate corresponding to the first candidate NGSO satellite, communication delay corresponding to the first candidate NGSO satellite, and communication reliability corresponding to the first candidate NGSO satellite. Here, the first parameter combination and the second parameter combination may be the same or different.

At S83, when determining that the network connection mode is NGSO satellite connection, the terminal accesses a network through the first NGSO satellite and sends a first request message carrying the first position to the network through the first NGSO satellite.

Here, when selecting the first NGSO satellite for access according to the second connection performance evaluation values, the terminal directly establishes the communication connection with the first NGSO satellite, so that various services are performed through the first NGSO satellite. In addition, the terminal also sends the first request message carrying the first position to the network through the first NGSO satellite, so as to request the core network to update the position of the terminal.

Specifically, when the terminal accesses the integration network through the first NGSO satellite for the first time, the first request message is the initial communication request message for requesting to access for the first time. After receiving the initial communication request message, the core network may also complete registration of the terminal and other processes. Elaborations are omitted herein. Before the terminal accesses the network through the first NGSO satellite, if the terminal accesses the network through the fixed access network or the mobile access network, the first request message is the connection update request message for requesting to update the network connection mode. After receiving the connection update request message, the core network may also update the connection mode of the terminal, for example, establish an association relationship between the terminal and the first NGSO satellite and its beam direction. Elaborations are omitted herein.

Through the above steps, the embodiments of the present disclosure may simplify the process of establishing the communication connection between the terminal and the NGSO satellite, reduce signaling overhead, and realize mobility management processes like updating the position of the terminal when the terminal initially accesses the network or updates the network access mode.

In addition, in order to improve the security of network access, whether the terminal is a trusted terminal may be verified through authentication and other processing between the terminal and the core network before S81 in the embodiments of the present disclosure. Specifically, when accessing the integration network for the first time, the terminal performs authentication and identity recognition with the core network of the integration network. The core network may also maintain the NGSO satellite ephemeris and the historical access information of the terminal in the integration network. In this way, the core network may determine whether the terminal is a trusted terminal by performing authentication and identity recognition on the terminal and according to the historical access information of the terminal and whether the identifier and the beam identifier of the first NGSO satellite in the request message match the locally maintained NGSO satellite ephemeris. Only when the terminal is a trusted terminal, the core network of the integration network performs the operation of the position update of the terminal and provides services to the terminal.

In the embodiments of the present disclosure, after determining that the network connection mode is the NGSO satellite connection, the terminal may also actively initiate the position update process.

For example, the terminal obtains its own position (called the second position here for ease of description) from the GEO positioning satellite. When the second position satisfies the preset position update condition, the terminal initiates the position update process. For example, if the distance between the second position and its own position obtained by the terminal from the GEO positioning satellite last time is greater than a preset distance, it may be determined that the second position satisfies the preset position update condition. In this case, the terminal determines third connection performance evaluation values of all second candidate NGSO satellites by querying the NGSO satellite ephemeris, and selects the second NGSO satellite with the optimal third connection performance evaluation value from the second candidate NGSO satellites according to the third connection performance evaluation values. The second candidate NGSO satellites are the NGSO satellites, connectable at the second position, that are determined by the terminal according to the NGSO satellite ephemeris. Then, the terminal accesses a network through the second NGSO satellite and sends the position update request message carrying the second position to the network.

In the embodiments of the present disclosure, the terminal may obtain its second position periodically according to a certain preset first period, and compares the second position with its own position obtained in the last period to determine whether the second position satisfies the preset position update condition. In addition, in the embodiments of the present disclosure, the terminal may also periodically initiate the position update process according to a certain preset second period. When initiating the periodic position update process, the terminal may obtain its own position from the GEO positioning satellite, then determine the NGSO satellites that can be connected at the current position by querying the NGSO satellite ephemeris, select one NGSO satellite from them for access according to the connection performance evaluation values, and send the position update request message carrying its own position. Usually, the second period is greater than the first period.

Because the NGSO satellite moves according to a preset trajectory, after it is determined that the network connection mode is the NGSO satellite connection, the NGSO satellite of the network accessed by the terminal may change, in this case, a satellite switching process will be triggered. For example, the terminal may determine a switching time point of switching the NGSO satellite and a target NGSO satellite to be switched by querying the NGSO satellite ephemeris. Specifically, the terminal may determine, according to the motion trajectory of the NGSO satellite, a time point at which the position of the terminal will move out of the coverage area of the NGSO satellite currently selected for access, take the time point as the switching time point, and reselect the NGSO satellite for access from the NGSO satellites that can be connected by the terminal at the switching time point as the target NGSO satellite to be switched. Here, the target NGSO satellite may also be selected based on the connection performance evaluation values, that is, the connection performance evaluation values of all the NGSO satellites are calculated and the NGSO satellite with the optimal evaluation value is selected as the target NGSO satellite. In this way, when the switching time point arrives, the terminal directly switches to the target NGSO satellite, and sends the satellite switch request message carrying its current third position to the network through the target NGSO satellite.

It is to be noted that the above satellite switching process does not require the terminal to measure any received satellite signal in real time, nor does it require the network side to control the switching process, but the terminal actively initiates and completes satellite switching by itself. Because no switching control is required on the network side, the signaling overhead of the switching process may be reduced, and the implementation of the switching process may be simplified.

The mobility management method of the embodiments of the present disclosure is described above from the terminal side, and is further described below from the NGSO satellite side and the core network side.

Referring to FIG. 9, when applied to the first NGSO satellite in the integration network, the mobility management method of the embodiments of the present disclosure may include the following steps.

At S91, the first NGSO satellite receives the request message carrying the position of the terminal which is sent by the terminal.

Here, the request message may specifically be any one of the following messages: the initial communication request message for requesting to access for the first time, the connection update request message for requesting to update the network connection mode, the position update request message for requesting to perform the position update, and the satellite switch request message for requesting to switch the NGSO satellite.

At S92, the first NGSO satellite sends the request message to the core network of the integration network after adding the satellite identifier and beam identifier of this satellite to the request message.

Through the above steps, in the embodiments of the present disclosure, the NGSO satellite may send the request message to the core network after adding the satellite identifier, the beam direction and other information to the request message. In this way, the core network may perform the operation of position update according to the request message, so as to update the cell and/or TA corresponding to the terminal, and maintain the association relationship among the terminal, the cell and/or TA corresponding to the terminal, the satellite identifier and beam identifier of the first NGSO satellite providing access to the terminal.

Referring to FIG. 10, when applied to the core network of the integration network, the mobility management method of the embodiments of the present disclosure may include the following steps.

At S101, the core network receives the request message sent by the first NGSO satellite, the request message carrying the position of the terminal, and the identifier and beam identifier of the first NGSO satellite.

Here, the request message may specifically be any of the following messages: the initial communication request message for requesting to access for the first time, the connection update request message for requesting to update the network connection mode, the position update request message for requesting to perform position update, and the satellite switch request message for requesting to switch the NGSO satellite.

At S102, in a case that the terminal is a trusted terminal, the position update for the terminal is performed according to the position of the terminal, and the identifier and beam identifier of the first NGSO satellite carried in the request message.

Here, the core network may perform the operation of position update according to the request message, so as to update the cell and/or TA corresponding to the terminal according to the position of the terminal carried in the request message, and maintain the association relationship among the terminal, the cell and/or TA corresponding to the terminal, the satellite identifier and beam identifier of the first NGSO satellite providing access to the terminal.

In addition, when the request message is the satellite switch request message, the core network may also update the information of the NGSO satellite accessed by the terminal according to the identifier and beam identifier of the first NGSO satellite carried in the satellite switch request message.

Through the above steps, the terminal position update process on the core network side can be realized, so that the core network can provide services to the terminal according to the updated position. In addition, in the above position update process, the core network only needs to receive the request message sent by the NGSO satellite and update the position according to the request message without the need to control the access or switching process of the terminal, thereby simplifying the implementation of the position update process and reducing the signaling overhead.

According to at least one embodiment of the present disclosure, only when the terminal is a trusted terminal, the core network performs the operation of updating the position of the terminal and provides services to the terminal.

To determine whether the terminal is a trusted terminal, the following implementation modes are provided.

As an implementation mode of determining the trusted terminal, the core network may perform authentication and identity recognition on the terminal, and may determine whether the terminal is a trusted terminal according to whether the authentication and identity recognition of the terminal are successfully passed.

As another implementation mode of determining the trusted terminal, the core network also maintains the NGSO satellite ephemeris. The core network may perform authentication and identity recognition on the terminal, and match the identifier and the beam identifier of the first NGSO satellite in the request message with the locally maintained NGSO satellite ephemeris to obtain a match result. When the authentication and identity recognition of the terminal are passed, and the matching result is successful matching, the core network determines that whether the terminal is a trusted terminal, otherwise, the core network determines that the terminal is not a trusted terminal.

As yet another implementation mode of determining the trusted terminal, the core network also maintains the NGSO satellite ephemeris and the historical access information of each terminal in the integration network. The core network may also perform authentication and identity recognition on the terminal and match the identifier and the beam identifier of the first NGSO satellite in the request message with the locally maintained NGSO satellite ephemeris to obtain a match result, and judge whether the access of the terminal is normal according to the historical access information of the terminal, and obtain a judgment result. Then, when the authentication and identity recognition of the terminal are passed, the matching result is successful matching, and the access of the terminal is normal, the core network determines that whether the terminal is a trusted terminal, otherwise, the core network determines that the terminal is not a trusted terminal. Judging whether the access of the terminal is normal according to the historical access information of the terminal may specifically be judging whether a user access position is abnormal. For example, the core network records a position area where the user accesses normally, so as to make judgment based on it; of course, the core network may also make judgment in other ways, which is not specifically limited by the embodiments of the present disclosure.

In addition, it is to be noted that the above method may be implemented by one network element on the core network side or by different network elements, which is not specifically limited by the embodiments of the present disclosure.

Various methods of the embodiments of the present disclosure are described above. Devices for implementing the above methods are provided below.

Referring to FIG. 11, the embodiments of the present disclosure provide a terminal 110, which may include: a processor 111 and a transceiver 112.

The processor 111 is configured to obtain the first position of the terminal from the GEO positioning satellite, and look up the first communication calendar according to the first position to determine the network connection mode of the terminal, the first communication calendar including the NGSO satellite ephemeris and/or the terrestrial communication calendar.

Here, the NGSO satellite ephemeris includes at least one of position, trajectory and connection capability of the NGSO satellite; the terrestrial communication calendar includes the connection capability and coverage area of the fixed access network and/or the mobile access network; and the network connection mode is the NGSO satellite connection, the fixed access network connection or the mobile access network connection.

The transceiver 112 is configured to, when determining that the network connection mode is NGSO satellite connection, access a network through the first NGSO satellite and send the first request message carrying the first position to the network through the first NGSO satellite. The access networks of the integration network include the satellite access network and the terrestrial access network, the satellite access network includes a plurality of NGSO satellites, and the terrestrial access network includes the fixed access network and/or the mobile access network.

Optionally, when looking up the first communication calendar, according to the first position to determine the network connection mode of the terminal, the processor is further configured to: look up the first communication calendar according to the first position to determine the candidate access networks at the first position; determine the first connection performance evaluation values of all the candidate access networks, and select the target access network according to the first connection performance evaluation values; and when the target access network is the satellite access network, determine the second connection performance evaluation values of all the first candidate NGSO satellites, and select the first NGSO satellite according to the second connection performance evaluation values. The first candidate NGSO satellites are the NGSO satellites, connectable at the first position, that are determined by the terminal according to the NGSO satellite ephemeris.

Optionally, the connection capability includes at least one of following: signal quality, communication rate, communication delay, and communication reliability. The processor is further configured to: calculate the first connection performance evaluation values of all the candidate access networks according to the first parameter combination. The first parameter combination includes at least one of following: user preference for the access network, signal quality corresponding to the candidate access network, communication rate corresponding to the candidate access network, communication delay corresponding to the candidate access network, and communication reliability corresponding to the candidate access network.

Optionally, when determining the second connection performance evaluation values of all the candidate NGSO satellites, the processor is further configured to: calculate the second connection performance evaluation values of all the candidate NGSO satellites according to the second parameter combination. The second parameter combination includes at least one of following: user preference for the access network, signal quality corresponding to the first candidate NGSO satellite, communication rate corresponding to the first candidate NGSO satellite, communication delay corresponding to the first candidate NGSO satellite, and communication reliability corresponding to the first candidate NGSO satellite.

Optionally, when looking up the first communication calendar according to the first position to determine the candidate access networks at the first position, the processor is further configured to: look up the NGSO satellite ephemeris according to the first position to determine the NGSO satellites that are connectable at the first position, and add them to the candidate access networks as a candidate satellite access network; and look up the terrestrial communication calendar according to the first position to select the fixed access network and/or the mobile access network whose coverage area includes the first position, and add the same to the candidate access networks.

Optionally, the processor is further configured to: after determining that the network connection mode is the NGSO satellite connection, obtain the second position of the terminal from the GEO positioning satellite; when the second position satisfies the preset position update condition, determine the third connection performance evaluation values of all second candidate NGSO satellites by querying the NGSO satellite ephemeris, and select the second NGSO satellite according to the third connection performance evaluation values. The second candidate NGSO satellites are the NGSO satellites, connectable at the second position, that are determined by the terminal according to the NGSO satellite ephemeris.

The transceiver is further configured to access the network through the second NGSO satellite and send the position update request message carrying the second position to the network.

Optionally, the processor is further configured to determine, after determining that the network connection mode is the NGSO satellite connection, the switching time point of switching the NGSO satellite and the target NGSO satellite to be switched by querying the NGSO satellite ephemeris.

The transceiver is further configured for the terminal to directly switch to the target NGSO satellite when the switching time point arrives and send the satellite switch request message carrying a current third position of the terminal to the network through the target NGSO satellite.

Optionally, when the terminal accesses the integration network through the first NGSO satellite for the first time, the first request message is the initial communication request message for requesting to access for the first time.

Before the terminal accesses the network through the first NGSO satellite, when the terminal accesses the network through the fixed access network or the mobile access network, the first request message is a connection update request message for requesting to update the network connection mode.

Optionally, the processor is further configured for the terminal, when accessing the integration network for the first time, to perform authentication and identity recognition with the core network of the integration network to determine whether the terminal is a trusted terminal. Only when the terminal is a trusted terminal, the core network of the integration network performs the operation of position update of the terminal and provides services to the terminal.

It is to be noted that the device in the present embodiment is the device corresponding to the method shown in FIG. 8, and the implementation modes in the above embodiments are applicable to the embodiment of the device, and can achieve the same technical effect. The device provided by the embodiments of the present disclosure can implement all the steps implemented in the above embodiments of the method, and can achieve the same technical effect. The same parts and beneficial effects in the present embodiment as in the embodiments of the method will not be described in detail here.

Figure 12:
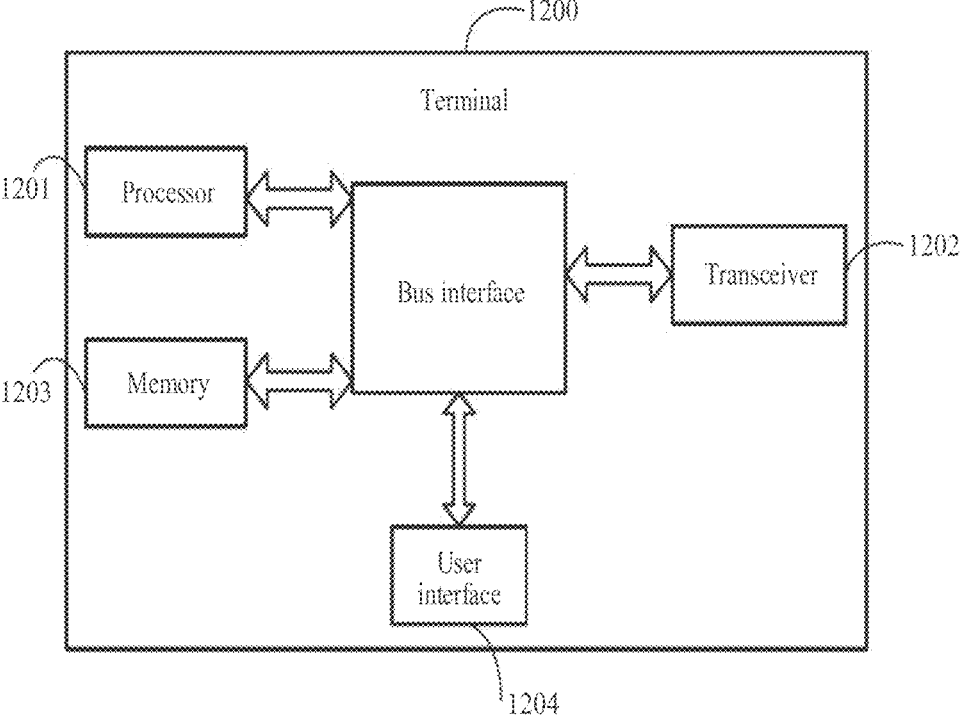
FIG. 12 is another structural schematic diagram of a terminal provided by the embodiments of the present disclosure.

FIG. 12 shows a structural schematic diagram of a terminal provided by the embodiments of the present disclosure. The terminal 1200 may include: a processor 1201, a transceiver 1202, a memory 1203, a user interface 1204 and a bus interface.

In the embodiments of the present disclosure, the terminal 1200 may also include: a program stored in the memory 1203 and capable of running in the processor 1201.

The processor 1201 implements the following steps when executing the program.

Optionally, when executing the program, the processor also implements the following steps.

The first position of the terminal is obtained from the GEO positioning satellite.

According to the first position, the first communication calendar is looked up to determine the network connection mode of the terminal, the first communication calendar including the NGSO satellite ephemeris and/or the terrestrial communication calendar.

When it is determined that the network connection mode is NGSO satellite connection, the network is accessed through the first NGSO satellite, and the first request message carrying the first position is sent to the network through the first NGSO satellite.

Here, the NGSO satellite ephemeris includes at least one of position of the NGSO satellite, trajectory of the NGSO satellite and connection capability of the NGSO satellite; the terrestrial communication calendar includes the connection capability and coverage area of the fixed access network and/or the mobile access network; and the network connection mode is the NGSO satellite connection, the fixed access network connection or the mobile access network connection.

It is understandable that, in the embodiments of the present disclosure, when executed by the processor 1201, the computer program can implement each process of the embodiment of the mobility management method shown in FIG. 8, and can achieve the same technical effect. For avoiding repetitions, elaborations are omitted herein.

In FIG. 12, a bus architecture may consist of any number of interconnected buses and bridges which are linked together by various circuits of one or more processors represented by the processor 1201 and memories represented by the memory 1203. The bus architecture may also link various other circuits together, such as peripheral devices, voltage regulators, and power management circuits, which are well known in the field and therefore are not described further here. The bus interface provides the interface. The transceiver 1202 may be multiple components, that is, includes a transmitter and a receiver, which provide a unit for communicating with a variety of other devices on a transmission medium. For different user devices, a user interface 1204 may also be used to connect externally and internally required devices. The connected devices include, but are not limited to, keypads, monitors, speakers, microphones, joysticks, etc.

The processor 1201 is responsible for managing the bus architecture and general processing, and the memory 1203 may store the data used by the processor 1201 to perform operations.

It is to be noted that the terminal in the present embodiment is the terminal corresponding to the method shown in FIG. 8, and the implementation modes in the above embodiments are applicable to the embodiment of the terminal, and can achieve the same technical effect. In the terminal, the transceiver 1202 and the memory 1203, as well as the transceiver 1202 and the processor 1201 can be in communicate connection through the bus interface, the functions of the processor 1201 can also be implemented by the transceiver 1202, and the functions of the transceiver 1202 can also be implemented by the processor 1201. It is to be noted that the terminal provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

The first position of the terminal is obtained from the GEO positioning satellite.

According to the first position, the terminal looks up the first communication calendar to determine the network connection mode of the terminal, the first communication calendar including the NGSO satellite ephemeris and/or the terrestrial communication calendar.

When it is determined that the network connection mode is NGSO satellite connection, the network is accessed through the first NGSO satellite, and the first request message carrying the first position is sent to the network through the first NGSO satellite.

Here, the NGSO satellite ephemeris includes at least one of position of the NGSO satellite, trajectory of the NGSO satellite and connection capability of the NGSO satellite; the terrestrial communication calendar includes the connection capability and coverage area of the fixed access network and/or the mobile access network; and the network connection mode is the NGSO satellite connection, the fixed access network connection or the mobile access network connection.

When executed by the processor, the program can implement all implementation modes in the mobility management method applied to the terminal side, and can achieve the same technical effect. For avoiding repetitions, elaborations are omitted herein.

Figure 13:
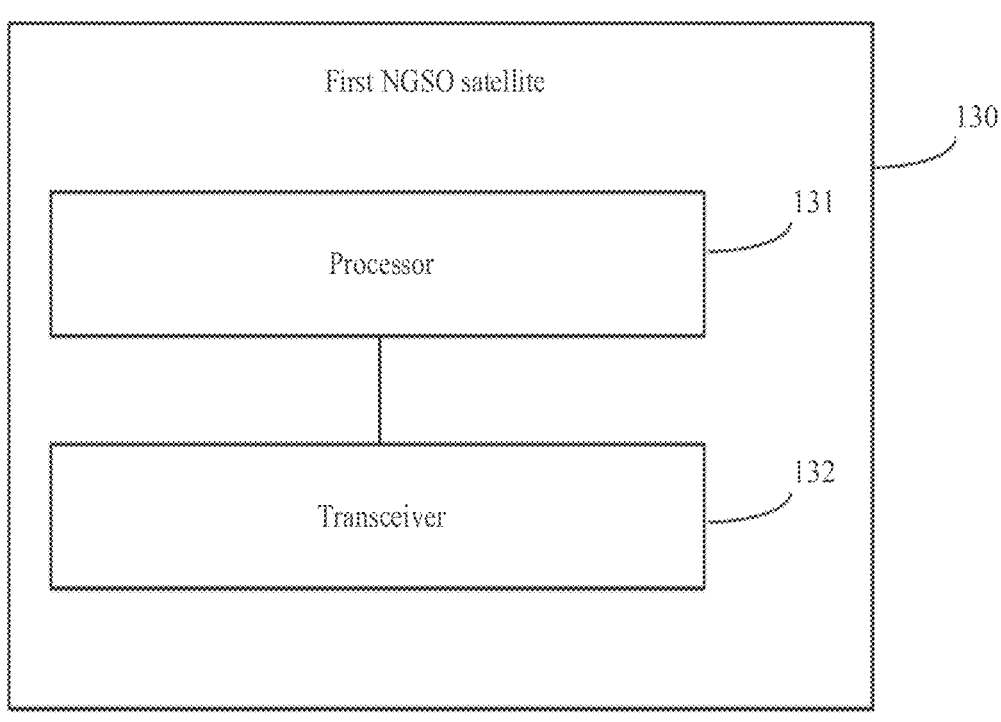
FIG. 13 is a structural schematic diagram of an NGSO satellite provided by the embodiments of the present disclosure.

The embodiments of the present disclosure provide the first NGSO satellite 130 shown in FIG. 13, which may include: a transceiver 132 and a processor 131.

The transceiver 132 is configured to receive the request message carrying the first position of the terminal which is sent by the terminal.

The processor 131 is configured to send the request message to the core network of the integration network after adding the satellite identifier and beam identifier of this satellite to the request message.

The access networks of the integration network include the satellite access network and the terrestrial access network, and the satellite access network includes a plurality of NGSO satellites.

Here, the terrestrial access network includes the fixed access network and/or the mobile access network.

Optionally, the request message is any one of the following messages: the initial communication request message for requesting to access for the first time, the connection update request message for requesting to update the network connection mode, the position update request message for requesting to perform position update; and the satellite switch request message for requesting to switch the NGSO satellite.

It is to be noted that the device in the present embodiment is the device corresponding to the method shown in FIG. 9, and the implementation modes in the above embodiments are applicable to the embodiment of the device, and can achieve the same technical effect. It is to be noted that, the device provided by the embodiments of the present disclosure can implement all the steps implemented in the above embodiments of the method, and can achieve the same technical effect. The same parts and beneficial effects in the present embodiment as in the embodiments of the method will not be described in detail here.

Figure 14:
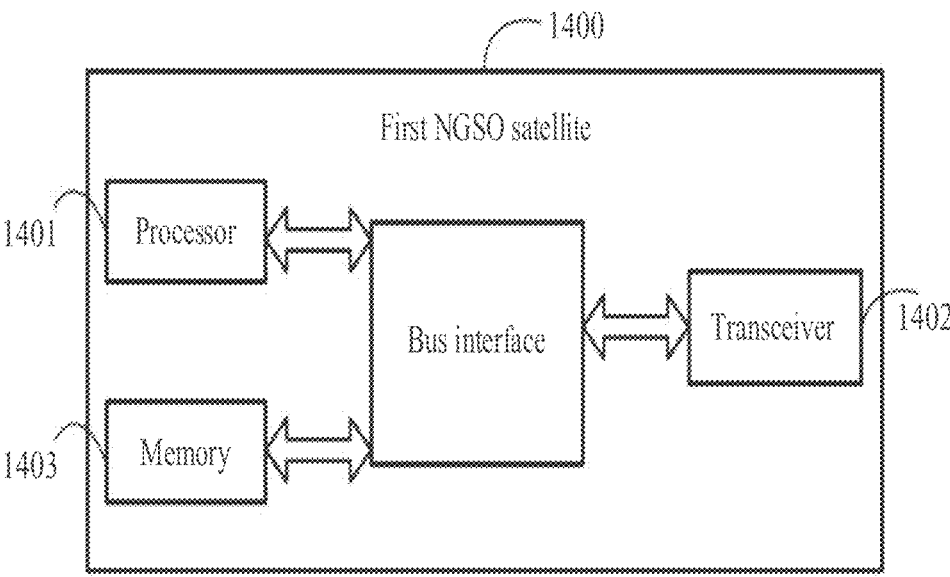
FIG. 14 is another structural schematic diagram of an NGSO satellite provided by the embodiments of the present disclosure.

Referring to FIG. 14, the embodiments of the present disclosure provide a structural schematic diagram of a first NGSO satellite 1400, which may include: a processor 1401, a transceiver 1402, a memory 1403 and a bus interface.

In the embodiments of the present disclosure, the first NGSO satellite 1400 may also include: a program stored in the memory 1403 and capable of running in the processor 1401. When executed by the processor 1401, the program implements the following steps.

The request message carrying the first position of the terminal which is sent by the terminal is received.

After adding the satellite identifier and beam identifier of this satellite to the request message, the request message is sent to the core network of the integration network.

It is understandable that, in the embodiments of the present disclosure, when executed by the processor 1401, the computer program can implement each process of the embodiment of the mobility management method shown in FIG. 9, and can achieve the same technical effect. For avoiding repetitions, elaborations are omitted herein.

In FIG. 14, a bus architecture may consist of any number of interconnected buses and bridges which are linked together by various circuits of one or more processors represented by the processor 1401 and memories represented by the memory 1403. The bus architecture may also link various other circuits together, such as peripheral devices, voltage regulators, and power management circuits, which are well known in the field and therefore are not described further here. The bus interface provides the interface. The transceiver 1402 may be multiple components, that is, includes a transmitter and a receiver, which provide a unit for communicating with a variety of other devices on a transmission medium.

The processor 1401 is responsible for managing the bus architecture and general processing, and the memory 1403 may store the data used by the processor 1401 to perform operations.

It is to be noted that the first NGSO satellite in the present embodiment is the NGSO satellite corresponding to the method shown in FIG. 9, and the implementation modes in the above embodiments are applicable to the embodiment of the NGSO satellite, and can achieve the same technical effect. In the terminal, the transceiver 1402 and the memory 1403, as well as the transceiver 1402 and the processor 1401 can be in communicate connection through the bus interface, the functions of the processor 1401 can also be implemented by the transceiver 1402, and the functions of the transceiver 1402 can also be implemented by the processor 1401. It is to be noted that the NGSO satellite provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

The request message carrying the first position of the terminal which is sent by the terminal is received.

After adding the satellite identifier and beam identifier of this satellite to the request message, the request message is sent to the core network of the integration network.

When executed by the processor, the program can implement all implementation modes in the mobility management method applied to the first NGSO satellite side, and can achieve the same technical effect. For avoiding repetitions, elaborations are omitted herein.

Figure 15:
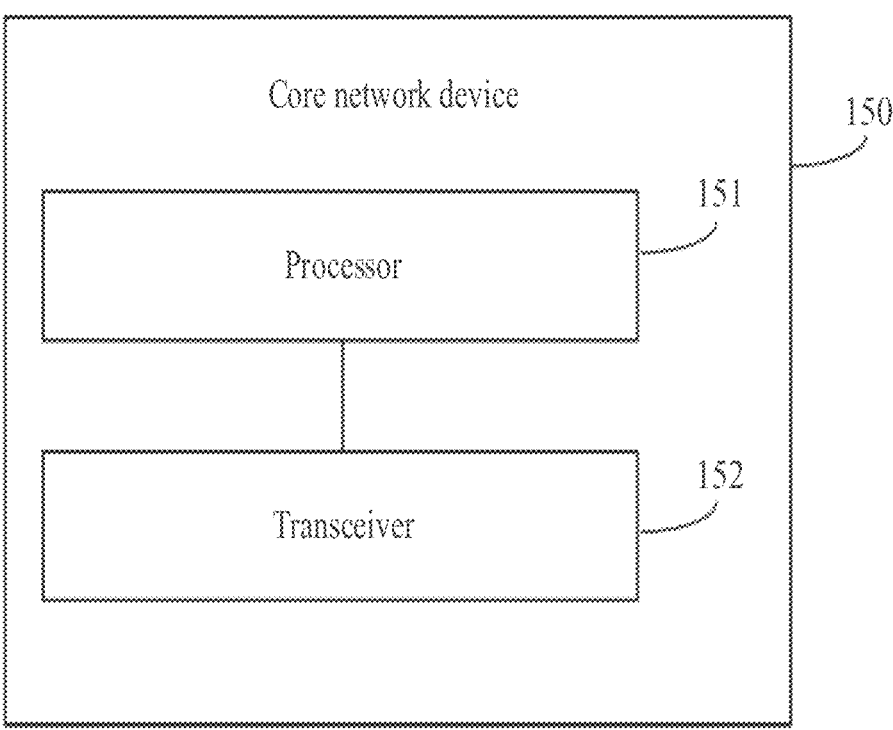
FIG. 15 is a structural schematic diagram of a core network device provided by the embodiments of the present disclosure.

The embodiments of the present disclosure provide a core network device 150 shown in FIG. 15, which may include: a transceiver 152 and a processor 151.

The transceiver 152 is configured to receive the request message sent by the first NGSO satellite, the request message carrying the position of the terminal, and the identifier and beam identifier of the first NGSO satellite.

The processor 151 is configured to perform, in a case that the terminal is a trusted terminal, position update for the terminal according to the position of the terminal, and the identifier and beam identifier of the first NGSO satellite carried in the request message.

The access networks of the integration network include the satellite access network and the terrestrial access network, and the satellite access network includes a plurality of NGSO satellites.

Here, the terrestrial access network includes the fixed access network and/or the mobile access network.

Optionally, the request message is any one of the following messages: the initial communication request message for requesting to access for the first time, the connection update request message for requesting to update the network connection mode, the position update request message for requesting to perform position update, and the satellite switch request message for requesting to switch the NGSO satellite.

Optionally, the processor is further configured to update, when the request message is the satellite switch request message, the information of the NGSO satellite accessed by the terminal according to the identifier and beam identifier of the first NGSO satellite carried in the satellite switch request message.

Optionally, the processor is further configured to update the cell and/or TA corresponding to the terminal and maintain the association relationship among the terminal, the cell and/or TA, the identifier and beam identifier of the first NGSO satellite according to the position of the terminal carried in the request message.

Optionally, the processor is further configured to determine whether the terminal is a trusted terminal by performing authentication and identity recognition for the terminal and according to the historical access information of the terminal and whether the identifier and beam identifier of the first NGSO satellite in the request message match the locally maintained NGSO satellite ephemeris.

Only when the terminal is a trusted terminal, the core network performs the operation of position update for the terminal and provides services to the terminal.

It is to be noted that the device in the present embodiment is the device corresponding to the method shown in FIG. 10, and the implementation modes in the above embodiments are applicable to the embodiment of the device, and can achieve the same technical effect. It is to be noted that the device provided by the embodiments of the present disclosure can implement all the steps implemented in the above embodiments of the method, and can achieve the same technical effect. The same parts and beneficial effects in the present embodiment as in the embodiments of the method will not be described in detail here.

Figure 16:
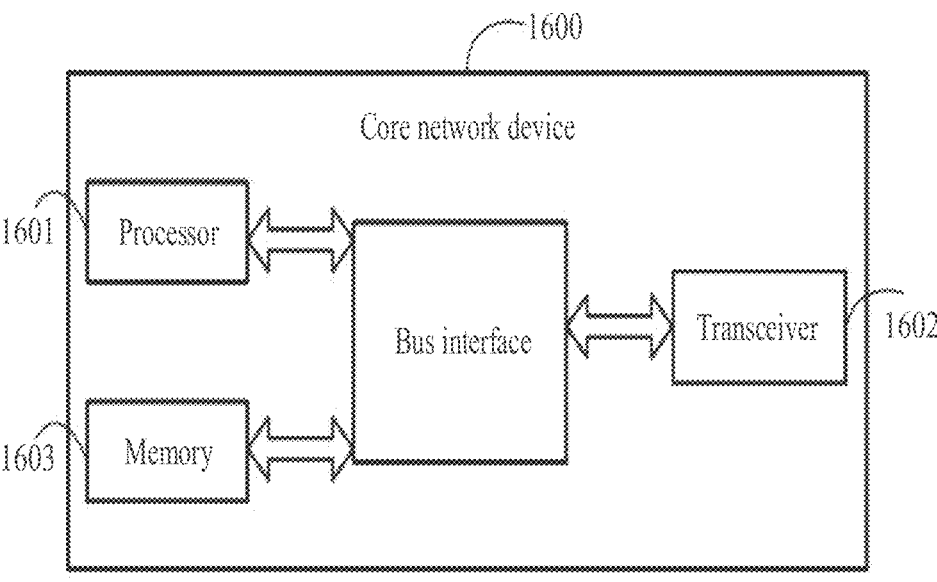
FIG. 16 is another structural schematic diagram of a core network device provided by the embodiments of the present disclosure.

Referring to FIG. 16, the embodiments of the present disclosure provide a structural schematic diagram of a core network device 1600, which may include: a processor 1601, a transceiver 1602, a memory 1603 and a bus interface.

In the embodiments of the present disclosure, the core network device 1600 may also include: a program stored in the memory 1603 and capable of running in the processor 1601. When executed by the processor 1601, the program implements the following steps.

The request message sent by the first NGSO satellite is received, the request message carrying the position of the terminal, the identifier and beam identifier of the first NGSO satellite.

In a case that the terminal is a trusted terminal, position update for the terminal is performed according to the position of the terminal, the identifier and beam identifier of the first NGSO satellite carried in the request message.

It is understandable that, in the embodiments of the present disclosure, when executed by the processor 1601, the computer program can implement each process of the embodiment of the mobility management method shown in FIG. 10, and can achieve the same technical effect. For avoiding repetitions, elaborations are omitted herein.

In FIG. 16, a bus architecture may consist of any number of interconnected buses and bridges which are linked together by various circuits of one or more processors represented by the processor 1601 and memories represented by the memory 1603. The bus architecture may also link various other circuits together, such as peripheral devices, voltage regulators, and power management circuits, which are well known in the field and therefore are not described further here. The bus interface provides the interface. The transceiver 1602 may be multiple components, that is, includes a transmitter and a receiver, which provide a unit for communicating with a variety of other devices on a transmission medium.

The processor 1601 is responsible for managing the bus architecture and general processing, and the memory 1603 may store the data used by the processor 1601 to perform operations.

It is to be noted that the core network device in the present embodiment is the core network corresponding to the method shown in FIG. 10, and the implementation modes in the above embodiments are applicable to the embodiment of the core network device, and can achieve the same technical effect. In the core network device, the transceiver 1602 and the memory 1603, as well as the transceiver 1602 and the processor 1601 can be in communicate connection through the bus interface, the functions of the processor 1601 can also be implemented by the transceiver 1602, and the functions of the transceiver 1602 can also be implemented by the processor 1601. It is to be noted that, the core network device provided by the embodiments of the present disclosure can implement all the steps implemented in the above embodiments of the method, and can achieve the same technical effect. The same parts and beneficial effects in the present embodiment as in the embodiments of the method will not be described in detail here.

In some embodiments of the present disclosure, a computer-readable storage medium is also provided, in which a program is stored. When executed by the processor, the program implements the following steps.

The request message sent by the first NGSO satellite is received, the request message carrying the position of the terminal, the identifier and beam identifier of the first NGSO satellite.

In a case that the terminal is a trusted terminal, the position update for the terminal is performed according to the position of the terminal, the identifier and beam identifier of the first NGSO satellite carried in the request message.

When executed by the processor, the program can implement all implementation modes in the mobility management method applied to the core network side, and can achieve the same technical effect. For avoiding repetitions, elaborations are omitted herein.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that the specific working processes of the system, device and unit described above may refer to the corresponding processes in the method embodiment and will not be elaborated herein for convenient and brief description.

In the embodiments provided by the present application, it is to be understood that the disclosed device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions in the embodiments of the present disclosure according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the related art or part of the technical solutions may be embodied in form of software product, and the computer software product is stored in a storage medium, including multiple instructions configured to enable a computer device (which may be a personal computer, a server, a network device or the like) to execute all or part of the steps of the method in each embodiment of the disclosure. The storage media include: various media capable of storing program codes such as a USB flash disk, a mobile hard disk, a Read-Only Memory (ROM), a Random Access Memory (RAM), a magnetic disk or a compact disc.

Those ordinary skilled in the art may understand that all or a part of flows of the method in the above embodiments may be completed by related hardware controlled by a computer program. The program may be stored in a computer readable storage medium. When executed, the computer program may include the flows in the embodiments of the method. The storage medium may be a magnetic disk, a compact disc, an ROM, or an RAM.

It is understandable that these embodiments of the disclosure described here may be implemented by hardware, software, firmware, middleware, microcode, or a combination thereof. For hardware implementation, modules, units, subunits and so on may be realized in one or more of Application Specific Integrated Circuits (ASIC), Digital Signal Processors (DSP), DSP Devices (DSPD), Programmable Logic Devices (PLD), Field-Programmable Gate Arrays (FPGA), universal processors, controllers, microcontrollers, microprocessors, other electronic units for implementing the functions of the disclosure or a combination thereof.

For software implementation, the technology described in the embodiments of the present disclosure can be implemented through modules (such as procedures and functions) that perform the functions described in the embodiments of the disclosure. A software code can be stored in the memory and executed by the processor. The memory can be implemented in or outside the processor.

The above is only the specific implementation modes of the disclosure and not intended to limit the protection scope of the disclosure; any change or replacement that those skilled in the art can think of easily in the scope of technologies disclosed by the disclosure shall fall within the protection scope of the disclosure. Therefore, the scope of protection of the present disclosure shall be subject to the scope of protection of the claims.

What is claimed is:

1. A mobility management method, applied to a terminal in an integration network, wherein access networks of the integration network comprise a satellite access network and a terrestrial access network, the satellite access network comprises a plurality of Non-Geostationary Orbit (NGSO) satellites, and the method comprises:

obtaining a first position of the terminal from a Geosynchronous Earth Orbit (GEO) positioning satellite;

looking up, by the terminal according to the first position, a first communication calendar to determine a network connection mode of the terminal, the first communication calendar comprising an NGSO satellite ephemeris and/or a terrestrial communication calendar;

when determining that the network connection mode is NGSO satellite connection, accessing, by the terminal, a network through a first NGSO satellite and sending, by the terminal, a first request message carrying the first position to the network through the first NGSO satellite.

2. The method of claim 1, wherein the terrestrial access network comprises a fixed access network and/or a mobile access network; the NGSO satellite ephemeris comprises at least one of position of the NGSO satellite, trajectory of the NGSO satellite and connection capability of the NGSO satellite, and the connection capability comprises at least one of signal quality, communication rate, communication delay and communication reliability; the terrestrial communication calendar comprises a connection capability and coverage area of the fixed access network and/or the mobile access network; and the network connection mode is NGSO satellite connection, fixed access network connection or mobile access network connection.

3. The method of claim 1, wherein looking up, by the terminal according to the first position, the first communication calendar to determine the network connection mode of the terminal comprises:

looking up, according to the first position, the first communication calendar to determine candidate access networks at the first position;

determining first connection performance evaluation values of all the candidate access networks, and selecting a target access network according to the first connection performance evaluation values;

when the target access network is the satellite access network, determining second connection performance evaluation values of all first candidate NGSO satellites, and selecting the first NGSO satellite according to the second connection performance evaluation values, wherein the first candidate NGSO satellites are NGSO satellites, connectable at the first position, that are determined by the terminal according to the NGSO satellite ephemeris.

4. The method of claim 3, wherein, the operation of determining the first connection performance evaluation values of all the candidate access networks comprises:

calculating the first connection performance evaluation values of all the candidate access networks according to a first parameter combination, wherein the first parameter combination comprises at least one of following: user preference for access network, signal quality corresponding to candidate access network, communication rate, corresponding to candidate access network communication delay corresponding to candidate access network, and communication reliability corresponding to candidate access network.

5. The method of claim 3, wherein the operation of determining the second connection performance evaluation values of all the candidate NGSO satellites comprises:

calculating the second connection performance evaluation values of all the candidate NGSO satellites according to a second parameter combination, wherein the second parameter combination comprises at least one of following: user preference for access network, signal quality corresponding to first candidate NGSO satellite, communication rate corresponding to first candidate NGSO satellite, communication delay corresponding to first candidate NGSO satellite, and communication reliability corresponding to first candidate NGSO satellite.

6. The method of claim 3, wherein looking up, according to the first position, the first communication calendar to determine the candidate access networks at the first position comprises:

looking up, according to the first position, the NGSO satellite ephemeris to determine NGSO satellites that are connectable at the first position, and adding the determined NGSO satellites to the candidate access networks as a candidate satellite access network; and looking up, according to the first position, the terrestrial communication calendar to select at least one of a fixed access network or a mobile access network whose coverage area comprises the first position, and adding the selected at least one of fixed access network or mobile access network to the candidate access networks.

7. The method of claim 1, wherein after determining that the network connection mode is the NGSO satellite connection, the method further comprises:

obtaining, by the terminal, a second position of the terminal from the GEO positioning satellite;

when the second position satisfies a preset position update condition, determining third connection performance evaluation values of all second candidate NGSO satellites by querying the NGSO satellite ephemeris, and selecting the second NGSO satellite according to the third connection performance evaluation values, wherein the second candidate NGSO satellites are NGSO satellites, connectable at the second position, that are determined by the terminal according to the NGSO satellite ephemeris; and accessing, by the terminal, a network through the second NGSO satellite and sending a position update request message carrying the second position to the network.

8. The method of claim 1, wherein after determining that the network connection mode is the NGSO satellite connection, the method further comprises:

determining, by the terminal, a switching time point of switching the NGSO satellite and a target NGSO satellite to be switched by querying the NGSO satellite ephemeris; and when the switching time point arrives, directly switching, by the terminal, to the target NGSO satellite, and sending a satellite switch request message carrying a current third position of the terminal to the network through the target NGSO satellite.

9. The method of claim 1, wherein, when the terminal accesses the integration network through the first NGSO satellite for the first time, the first request message is an initial communication request message for requesting to access for the first time;

before the terminal accesses the network through the first NGSO satellite, when the terminal accesses the network through the fixed access network or the mobile access network, the first request message is a connection update request message for requesting to update the network connection mode.

10. The method of claim 1, wherein when the terminal accesses the integration network for the first time, the method further comprises:

performing, by the terminal, authentication and identity recognition with a core network of the integration network to determine whether the terminal is a trusted terminal; wherein, only when the terminal is a trusted terminal, the core network of the integration network performs an operation of position update of the terminal and provides services to the terminal.

11. A mobility management method applied to a core network in an integration network, wherein access networks of the integration network comprise a satellite access network and a terrestrial access network, and the satellite access network comprises a plurality of Non-Geostationary Orbit (NGSO) satellites, the method comprises:

receiving, by the core network, a request message sent by a first NGSO satellite, the request message carrying a position of a terminal, and an identifier and beam identifier of the first NGSO satellite; and in a case that the terminal is a trusted terminal, performing position update for the terminal according to the position of the terminal, and the identifier and beam identifier of the first NGSO satellite carried in the request message, wherein the request message is any one of following messages:

an initial communication request message for requesting to access for a first time;

a connection update request message for requesting to update a network connection mode;

a position update request message for requesting to perform position update; and a satellite switch request message for requesting to switch NGSO satellite.

12. A terminal in an integration network, comprising:

a processor, configured to obtain a first position of the terminal from a Geo-synchronous Earth Orbit (GEO) positioning satellite, and look up a first communication calendar according to the first position to determine a network connection mode of the terminal, the first communication calendar comprising a Non-Geostationary Orbit (NGSO) satellite ephemeris and/or a terrestrial communication calendar; and a transceiver, configured to access a network through a first NGSO satellite and send a first request message carrying the first position to the network through the first NGSO satellite when determining that the network connection mode is NGSO satellite connection;

wherein, access networks of the integration network comprise a satellite access network and a terrestrial access network, and the satellite access network comprises a plurality of NGSO satellites.

13. The terminal of claim 12, wherein when looking up, according to the first position, the first communication calendar to determine the network connection mode of the terminal, the processor is further configured to:

look up, according to the first position, the first communication calendar to determine candidate access networks at the first position;

determine first connection performance evaluation values of all the candidate access networks, and select a target access network according to the first connection performance evaluation values;

when the target access network is the satellite access network, determine second connection performance evaluation values of all first candidate NGSO satellites, and select the first NGSO satellite according to the second connection performance evaluation values, wherein the first candidate NGSO satellites are NGSO satellites, connectable at the first position, that are determined by the terminal according to the NGSO satellite ephemeris.

14. The terminal of claim 13, wherein, when determining the second connection performance evaluation values of all the candidate NGSO satellites, the processor is further configured to:

calculate the second connection performance evaluation values of all the candidate NGSO satellites according to a second parameter combination, wherein the second parameter combination comprises at least one of following: user preference for access network, signal quality corresponding to first candidate NGSO satellite, communication rate corresponding to first candidate NGSO satellite, communication delay corresponding to first candidate NGSO satellite, and communication reliability corresponding to first candidate NGSO satellite.

15. The terminal of claim 12, wherein the terrestrial access network comprises a fixed access network and/or a mobile access network; the NGSO satellite ephemeris comprises at least one of position of the NGSO satellite, trajectory of the NGSO satellite and connection capability of the NGSO satellite, and the connection capability comprises at least one of signal quality, communication rate, communication delay and communication reliability; the terrestrial communication calendar comprises a connection capability and coverage area of the fixed access network and/or the mobile access network; and the network connection mode is NGSO satellite connection, fixed access network connection or mobile access network connection.

16. The terminal of claim 13, wherein the processor is specifically configured to:

calculate the second connection performance evaluation values of all the candidate NGSO satellites according to a second parameter combination, wherein the second parameter combination comprises at least one of following: user preference for access network, signal quality corresponding to first candidate NGSO satellite, communication rate corresponding to first candidate NGSO satellite, communication delay corresponding to first candidate NGSO satellite, and communication reliability corresponding to first candidate NGSO satellite.

17. The terminal of claim 12, wherein after determining that the network connection mode is the NGSO satellite connection, the processor is further configured to:

obtain a second position of the terminal from the GEO positioning satellite;

when the second position satisfies a preset position update condition, determine third connection performance evaluation values of all second candidate NGSO satellites by querying the NGSO satellite ephemeris, and select the second NGSO satellite according to the third connection performance evaluation values, wherein the second candidate NGSO satellites are NGSO satellites, connectable at the second position, that are determined by the terminal according to the NGSO satellite ephemeris; and the transceiver is further configured to:

access a network through the second NGSO satellite and send a position update request message carrying the second position to the network.

18. The terminal of claim 12, wherein after determining that the network connection mode is the NGSO satellite connection, the processor is further configured to:

determine a switching time point of switching the NGSO satellite and a target NGSO satellite to be switched by querying the NGSO satellite ephemeris; and the transceiver is further configured to:

directly switch to the target NGSO satellite when the switching time point arrives, and send a satellite switch request message carrying a current third position of the terminal to the network through the target NGSO satellite.

19. The terminal of claim 12, wherein when the terminal accesses the integration network for the first time, the processor is further configured to:

perform authentication and identity recognition with a core network of the integration network to determine whether the terminal is a trusted terminal, wherein, only when the terminal is a trusted terminal, the core network of the integration network performs an operation of position update of the terminal and provides services to the terminal.

\* \* \* \* \*